(12) United States Patent
Millican et al.

(10) Patent No.: US 12,306,247 B2
(45) Date of Patent: May 20, 2025

(54) SYSTEM AND METHOD FOR OPTIMIZING FAULT COVERAGE BASED ON OPTIMIZED TEST POINT INSERTION DETERMINATIONS FOR LOGICAL CIRCUITS

(71) Applicant: Auburn University, Auburn, AL (US)

(72) Inventors: Spencer Millican, Auburn, AL (US); Yang Sun, Auburn, AL (US); Soham Roy, Auburn, AL (US); Vishwani D. Agrawal, Auburn, AL (US)

(73) Assignee: Auburn University, Auburn, AL (US)

( * ) Notice: Subject to any disclaimer, the term of this patent is extended or adjusted under 35 U.S.C. 154(b) by 1077 days.

(21) Appl. No.: 17/226,950

(22) Filed: Apr. 9, 2021

(65) Prior Publication Data

US 2021/0318379 A1 Oct. 14, 2021

Related U.S. Application Data

(60) Provisional application No. 63/123,717, filed on Dec. 10, 2020, provisional application No. 63/111,943, (Continued)

(51) Int. Cl.
*G01R 31/3183* (2006.01)
*G06F 30/337* (2020.01)
(Continued)

(52) U.S. Cl.
CPC ..... *G01R 31/31835* (2013.01); *G06F 30/337* (2020.01); *G06N 3/045* (2023.01); *G06N 20/00* (2019.01); *G06F 2117/02* (2020.01)

(58) Field of Classification Search
CPC .... G01R 31/31835; G06N 20/00; G06N 3/08; G06N 5/025; G06F 2117/02
See application file for complete search history.

(56) References Cited

U.S. PATENT DOCUMENTS 11,010,516 B2 * 5/2021 Sikka .................. G06N 3/0418

OTHER PUBLICATIONS

Geuzebroek et al. Test Point Insertion that facilitates ATPG in reducing test time and data volume IEEE 2002 (Year: 2002).*

(Continued)

*Primary Examiner* — Rehana Perveen
*Assistant Examiner* — Cuong V Luu
(74) *Attorney, Agent, or Firm* — Christopher M. Scherer; DeWitt LLP

(57) ABSTRACT

The methods and systems are directed to automated computer analysis and machine learning. Specifically, the systems and methods for using machine learning to generate fault prediction models and applying the fault prediction models to logical circuits to optimize test point insertion determinations and optimize fault detection in the logical circuit. Disclosed are methods and systems that that generates training data from training circuits (and optionally generate training circuits), trains a learning segment (which may include an artificial neural network (ANN)) using the training data. The learning segment (once trained) generates fault prediction models to predict the quality of a TP inserted on a given circuit location and optimize TPI for a given circuit. The methods and systems described provide computational (CPU/processing) time advantages and precision over conventional methods.

20 Claims, 5 Drawing Sheets

Related U.S. Application Data filed on Nov. 10, 2020, provisional application No. 63/007,495, filed on Apr. 9, 2020.

(51) Int. Cl.
```
G06N 3/045      (2023.01)
G06N 20/00      (2019.01)
G06F 117/02     (2020.01)
```

(56)  References Cited

OTHER PUBLICATIONS

Chakradhar et al. Toward Massively Parallel Automatic Test Generation IEEE Transactions on Computer-Aided Design vol. 9 No. 9, Sep. 1990 (Year: 1990).*
C. Acero et al., "Embedded Deterministic Test Points," IEEE Transactions on Very Large Scale Integration VLSI System, vol. 25, No. 10, pp. 2949-2961, Oct. 2017.
Aminian and F. Aminian, "Neural-network based analog-circuit fault diagnosis using wavelet transform as preprocessor," IEEE Trans. Circuits Syst. II Analog Digit. Signal Process., vol. 47, No. 2, pp. 151-156, 2000.
P. H. Bardell and W. H. McAnney, "Self-Testing of Multichip Logic Modules," in Proc. International Test Conference (ITC), 1982, pp. 200-204.
F. Brglez, "On Testability Analysis of Combinational Networks," in Proc. IEEE International Symposium on Circuits and Systems (ISCAS), May 1984, pp. 221-225.
F. Brglez and H. Fujiwara, "A Neutral Netlist of 10 Combinational Benchmark Circuits and a Targeted Translator in Fortran," in IEEE International Symposium on Circuits and Systems, Jun. 1985, pp. 1929-1934.
A. Briers and Totton, K., "Random pattern testability by fast fault simulation," in Proc. IEEE International Test Conference, 1986, pp. 274-281.
T. Chakradhar, M. L. Bushnell, and V. D. Agrawal, "Toward massively parallel automatic test generation," IEEE Trans. Comput. Des. Integr. Circuits Syst., vol. 9, No. 9, pp. 981-994, Sep. 1990.
M. Chern et al., "Improving Scan Chain Diagnostic Accuracy Using Multi-Stage Artificial Neural Networks," in Proc. 24th Asia and South Pacific Design Automation Conference, New York, NY, Jan. 2019, pp. 341-346.
F. Como, M. S. Reorda, and G. Squillero, "RT-level ITC'99 benchmarks and first ATPG results," IEEE Des. Test Comput., vol. 17, No. 3, pp. 44-53, 2000.
R. David, "Signature Analysis for Multiple-Output Circuits", IEEE Trans. Comput., vol. C-35, No. 9, pp. 830-837, Sep. 1986.
S. Davidson, "ITC'99 Benchmark Circuits—Preliminary Results," in Proc. IEEE International Test Conference, Atlantic City, NJ, Jan. 1999, pp. 1125-1125.
M. J. Geuzebroek, J. T. Van Der Linden, and a. J. Van De Goor, "Test point insertion for compact test sets," Proc. Int. Test Conf. 2000 (IEEE Cat. No. 00CH37159), pp. 292-301, 2000.
M. J. Geuzebroek, J. T. Van Der Linden, and a. J. Van De Goor, "Test point insertion that facilitates ATPG in reducing test time and data volume," Proceedings. Int. Test Conf., 2002.
S. Ghosh, E. MacDonald, S. Basu, and N. A. Touba, "Low-power Weighted Pseudo-random BIST Using Special Scan Cells," in Proc. 14th ACM Great Lakes Symposium on VLM (GLSVLSI), New York, NY, USA, 2004, pp. 86-91.
S. Ghosh, S. Bhunia, A. Raychowdhury, and K. Roy, "A Novel Delay Fault Testing Methodology Using Low-Overhead Built-In Delay Sensor," IEEE Transaction Computer-Aided Design Integration Circuits System, vol. 25, No. 12, pp. 2934-2943, Dec. 2006.
L. R. Gomez and H. Wunderlich, "A Neural-Network-Based Fault Classifier," in Proc. 25th IEEE Asian Test Symposium (ATS), 2016, pp. 144-149.

J. P. Hayes and A. D. Friedman, "Test Point Placement to Simplify Fault Detection," IEEE Trans. Comput., vol. C-23, No. 7, pp. 727-735, 1974.
F. P. Higgins and R. Srinivasan, "BSM2: next generation boundary-scan master," in Proc. 18th IEEE VLSI Test Symposium (VTS), Montreal, Quebec, Canada, 2000, pp. 67-72.
S. Hellebrand, J. Rajski, S. Tarnick, S. Venkataraman, and B. Courtois, "Built-in Test for Circuits with Scan Based on Reseeding of Multiplepolynomial Linear Feedback Shift Registers," IEEE Trans. Comput., vol. 44, No. 2, pp. 223-233, Feb. 1995.
B. Karlik, "Performance analysis of various activation functions in generalized MLP architectures of neural networks," Int. J. Artif Intell. Expert Syst., \o\. I, No. 4, pp. 111-122, 2015.
G. N. Karystinos and D. A. Pados, "On overfitting, generalization, and randomly expanded training sets," IEEE Transaction Neural Networks, vol. 11, No. 5, pp. 1050-1057, Sep. 2000.
D. P. Kingma and J. Ba, "Adam: A Method for Stochastic Optimization," Dec. 2014, Accessed: Oct. 5, 2020. [Online]. Available: http://arxiv.org/abs/1412.6980.
I. Koren and Z. Koren, "Defect Tolerance in VLSI Circuits: Techniqi and Yield Analysis," Proc. IEEE, vol. 86, No. 9, pp. 1819-1838, Sep. 1998.
B. Krishnamurthy, "A Dynamic Programming Approach to the Test Point Insertion Problem," in Proc. 24th ACM/IEEE Design Automation Conference, New York, NY, USA, 1987, pp. 695-705.
Y. Ma et al., High Performance Graph Convolutional Networks with Applications in Testability Analysis, in Proc. 56th Annual Design Automation Conference (DAC), New York, NY, USA, 2019, pp. 18:1-18:6.
A. L. Maas, A. Y. Hannun, and A. Y. Ng, "Rectifier nonlinearities improve neural network acoustic models," in Proc. icml, 2013, vol. 30, No. 1, p. 3.
J. Mahmod, S. Millican, U. Guin, and V. Agrawal, "Delay Fault Testing: Present and Future," in Proc. IEEE VLSI Test Symposium (VTS), Monterey, CA, 2019.
A. Menon, K. Mehrotra, C. K. Mohan, and S. Ranka, "Characterization of a Class of Sigmoid Functions with Applications to Neural Networks," NeuralNetw., vol. 9, No. 5, pp. 819-835, Jul. 1996.
P. K. Nag, A. Gattiker, Sichao Wei, R. D. Blanton, and W. Maly, "Modeling the Economics of Testing: a DFT Perspective," IEEE Design & Test Computers, vol. 19, No. 1, pp. 29-41, fan. 2002.
P. Nigh and A. Gattiker, Test Method Evaluation Experiments and Data, in Proc. International Test Conference (ITC), 2000, pp. 454-463.
D. Nguyen and B. Widrow, "Improving the learning speed of 2-layer neural networks by choosing initial values of the adaptive weights," 1990 IJCNN Int. Jt. Conf. Neural Networks, pp. 21-26 vol. 3, 1990.
I. Pomeranz and S. M. Reddy, "Design-for-testability for Path Delay Faults in Large Combinational Circuits Using Test Points," IEEE Trans. Comput.-Aided Des. Integr. Circuits Syst., vol. 17, No. 4, pp. 333-343, Apr. 1998.
I. Pomeranz, "Computation of Seeds for LFSR-Based n-Detection Test Generation," ACM Transaction on Design Automation of Electronic Systems, vol. 22, No. 2, pp. 1-13, Jan. 2017.
J. Pradeep, E. Srinivasan, and S. Himavathi, "Diagonal based feature extraction for handwritten character recognition system using neural network," ICECT 2011—2011 3rd Int. Conf. Electron. Comput. Technol., vol. 4, pp. 364-368, 2011.
S. Roy, B. Stiene, S. K. Millican and V. D. Agrawal, "Improved Random Pattern Delay Fault Coverage Using Inversion Test Points," in Proc. IEEE 28th North Atlantic Test Workshop (NATW), Burlington, VT, May 2019, pp. 206-211.
J. Savir, "Skewed-Load Transition Test: Part I, Calculus," in Proc. International Test Conference, Baltimore, MD, Sep. 1992, pp. 705-713.
K. Seshan, "Reliability Issues: Reliability Imposed Limits to Scaling," in Handbook of Thin Film Deposition (Fourth Edition). William Andrew Publishing, 2018, pp. 43-62.
Y. Sun and S. Millican, "Test Point Insertion Using Artificial Neural Networks," in Proc. IEEE Computer Society Annual Symposium on VLSI (ISVLSI), Miami, FL, Jul. 2019, pp. 253-258.

(56) References Cited

OTHER PUBLICATIONS

J. Sziray, "Test Generation and Computational Complexity," in IEEE 17th Pacific Rim International Symposium on Dependable Computing, Pasadena, CA, Dec. 2011, pp. 286-287.

N. Tamarapalli and J. Rajski, "Constructive Multi-phase Test Point Insertion for Scan-based BIST," in Proc. IEEE International Test Conference, Washington, DC, Oct. 1996, pp. 649-658.

H. Tatsumi, Y. Murai, and S. Tokumasu, "Logic circuit diagnosis by using neural networks," in Proc. IEEE International Symposium on Multiple-Valued Logic, 2001, pp. 345-350.

N. A. Touba and E. J. McCluskey, "Test Point Insertion Based on Path Tracing," in Proc. VLSI Test Symposium, 1996, pp. 2-8.

H.-C. Tsai, K.-T. Cheng, C.-J. Lin, and S. Bhawmik, "A Hybrid Algorithm for Test Point Selection for Scan-based BIST," in Proc. 34th Design Automation Conference (DAC), Anaheim, CA, Jun. 1997, pp. 478-483.

T. W. Williams, "Test Length in a Self-Testing Environment," IEEE Des. Test Comput., vol. 2, No. 2, pp. 59-63, Apr. 1985. M. Nakao, S. Kobayashi, K. Hatayama, K. Iijima, and S. Terada, "Low Overhead Test Point Insertion for Scan-based BIST," in Proc. IEEE International Test Conference, 1999, pp. 348-357.

D. Xiang, X. Wen, and L. Wang, "Low-Power Scan-Based Built-In Self-Test Based on Weighted Pseudorandom Test Pattern Generation and Reseeding," IEEE Transactions on Very Large Scale Integration (VLSI) Systems, vol. 25, No. 3, pp. 942-953, Mar. 2017.

\* cited by examiner

SYSTEM AND METHOD FOR OPTIMIZING FAULT COVERAGE BASED ON OPTIMIZED TEST POINT INSERTION DETERMINATIONS FOR LOGICAL CIRCUITS

CROSS-REFERENCE TO RELATED APPLICATIONS

The present application claims priority of U.S. Provisional Application No. 63/007,495, filed Apr. 9, 2020, U.S. Provisional Application No. 63/111,943, filed Nov. 10, 2020, and U.S. Provisional Application No. 63/123,717, filed Dec. 10, 2020, the contents of which are incorporated herein by reference in their entireties.

FIELD

The present disclosure is directed to systems and methods of automated computer analysis and machine learning. Specifically, the present disclosure is directed to systems and methods for using machine learning to generate fault prediction models and applying the fault prediction models to logical circuits to optimize test point insertion determinations and optimize fault detection in the logical circuit.

BACKGROUND

The testing of logical circuits is essential to determining whether a chip is defective/faulty and ensuring chip quality and reliability. For modern technologies, creating high-quality digital tests is a challenge that, if fulfilled, provides several advantages to circuit developers and manufacturers. For example, semiconductor manufacturing is an imperfect process despite decades of semiconductor research, and the release of defective/faulty devices (logic circuits) has both economic (e.g., loss of reputation) and catastrophic (e.g., loss of life) consequences. This latter consequence is of growing concern for modern technologies, since devices (logic circuits) are more frequently deployed in life-critical applications (e.g., self-driving cars and embedded medical devices). For these reasons, creating high-quality manufacturing tests is necessary to detect, prevent the release of, and repair defective/faulty devices. Additionally, high-quality tests must be applied in-the-field after delivery: aggressive technology scaling accelerates post-manufacturing degradation and the occurrence of intermittent soft errors. Like predelivery tests, post-delivery tests must detect (and possibly correct) these post-delivery faults.

Pseudo-random digital circuit testing is an established industry practice due to its simplicity and significant fault coverage. Pseudo-random testing (often named "random testing") is the process of generating stimulus of a variable, yet predictable, nature and observing the response, often with on-chip stimulus and observation hardware. This test paradigm has been frequently studied and applied in industry due to its low-cost of implementation, significant stuck-at fault coverage, the ability to apply tests "at-speed", and the ability to apply tests "in-the-field" after a device is delivered to a customer.

Logic built-in self-test (LBIST) is an ideal test mechanism for delivering high-quality manufacturing tests and post-manufacturing reliability tests. LBIST uses on-chip stimulus generators, typically in the form of pseudo-random pattern generators (PRPGs), to stimulate and set the state of logic circuits while observing circuit responses. The logic circuit industry uses LBIST to apply manufacturing tests: LBIST can obtain significant fault coverage while decreasing test application time, which in turn reduces manufacturing test costs. Additionally, in-the-field tests can use LBIST. Since designers embed LBIST circuits into their devices, they can test circuits with minimal functional interruptions by saving the circuit state, applying test-enabling signals, and then re-loading the circuit state to resume normal operation.

However, when applied to modern circuits, pseudo-random tests can fail to excite and observe "random pattern resistant" (RPR) faults without circuit-specific considerations. RPR faults manifest in logic circuits with many inputs when few input combinations can excite select logic paths. A representative example of such a fault is the output of a 32-bit wide AND gate with its output stuck-at-0, which requires 32 logic-1 values to be applied to the inputs of the AND gate. Further keeping LBIST quality high is challenging under aggressive technology scaling: logic circuit complexity is growing faster than techniques can remedy. Particularly, LBIST tests have difficulty detecting RPR faults. These faults become more common as logic circuitry becomes more complex, which naturally occurs with technology scaling.

Detecting RPR faults with random stimulus requires either 1) modifying the pattern generator to create less "random" stimulus or 2) modifying the circuit to make RPR faults more easily tested with random stimulus. This later method, known as test point (TP) insertion (TPI), is frequently used in the industry due to its ability to be implemented on post-synthesis circuit netlists with minimal effort from circuit designers. Many techniques attempt to detect RPR faults using LBIST, including weighted random pattern testing, deterministic pattern seeding, and test point (TP) insertion (TPI). Unfortunately, the computational complexity of the processes that implement these techniques increases faster than the increasing size of logic circuits. Since computational resources are in high demand by several electronic design automation (EDA) tool users during circuit development, designers must sacrifice testability or other circuit qualities if EDA engineers do not increase processing efficiency.

TPs are circuit modifications which change circuit logic during test but do not change the circuit function when disabled. TPs are categorized into two types: control TPs and observe TPs. Control TPs change circuit controllability, which is the probability a line is logic-1 when random stimulus is applied. This is typically accomplished by inserting OR gates for control-1 TPs or AND gates for control-0 TPs and an extra "test enable" signal (TE). The goal of test points is to increase the probability of exciting faults in the circuit and to make faults easier to observe by creating propagation paths to circuit outputs. Observe TPs change circuit observability by inserting fan-outs to circuit outputs or memory, which makes the line (and fault effects on a line) easily observed.

Quality TP placement is a known computationally-infeasible problem. The challenge of TPI is placing the fewest number of TPs while maximizing fault coverage. Each TP requires logic circuitry, which in turn creates undesirable overheads: static and dynamic power, delay, and nonfunctional circuit area. Designers typically allocate budgets to TPs (and other DFT hardware), thus TPs must increase LBIST fault coverage to acceptable levels under these budgets. Selecting optimal TP locations (and many other DFT problems) is a known NP-hard problem, thus existing TPI methods rely on heuristic approaches to select TP locations. Inserting T TPs into a circuit among T' candidate TI's creates $C(T', T)$ possible TP choices, and finding the fault coverage impact of a choice requires computationally-intensive fault simulation. TPI heuristics address this by replacing fault simulation with less accurate fault coverage estimations while using greedy-algorithm approaches; however, TPI heuristics methods do require whole circuit calculations for each candidate TP.

Many methods have used circuit probability estimations to assist in identifying quality TP placement. For example, conventional methods have used the controllability observability program (COP) and other analogous methods to heuristically predict the impact TPs have on fault coverage and to iteratively insert TPs. However, this fault coverage of the COP and other algorithms, as indicated above, are probability estimations and not the exact actual fault coverage of the circuit as they do not consider the random nature of stimulus and are prone to miscalculations from reconvergent fan-outs.

The most common approach is iterative: heuristically evaluate candidate TPs to find the one which increases fault coverage the most, insert it, and repeat until no more TPs are desired or needed. Unfortunately, the computational complexity of iterative TPI grows faster than available computing resources. To insert a single TP, iterative TPI algorithms require evaluating every candidate TP, and the number of candidate TPs in a circuit is proportional to the size of the circuit (i.e., one or more candidate TPs can exist on every circuit line). Additionally, the complexity of TP-evaluating heuristics is linearly proportional to circuit size, and as circuit sizes increase, more TPs are needed to increase fault coverage to acceptable levels, presumably at a rate linearly proportional to the circuit size (i.e., if the circuit size is doubled, meeting fault coverage goals requires twice as many TPs). Therefore, if circuit size grows by C, TPI complexity grows by $C \cdot T \cdot T'$. Presuming computer speeds increase with circuit complexity (i.e., algorithm performance increases at a rate of C), TPI time will grow at a rate of $C \cdot T \cdot T'/C = T \cdot T'$.

Using TPs to increase random pattern effectiveness is well established, but TPI methods still strive to improve their accuracy and computational performance. Methods for "solving" the TPI problem have been improved through using fault simulation to classify RPR faults and propose TP locations, using automatic test pattern generation (ATPG), using gradient optimizing techniques, and by incorporating many other nuances and using a variety of algorithms. However, all of these methods are less-than-optimal. For example, "list-based heuristics" predict the impact of TPs have been demonstrated to be effective at increasing fault coverage under random stimulus. However, such methods are prone to inaccuracies and are also computationally intensive. Further, COP (and other analogous methods) cannot predict precise circuit controllability and observability measures (and thus testability measures) in the presence of reconvergent fan-outs. Therefore, TP placement using such methods is less than optimal. Also, although the time to heuristically predict a TP's impact on fault coverage using COP and other algorithms is significantly faster than a precise calculation (which requires fault simulation), predicting the impact of every candidate TP is computationally burdensome as whole circuit calculations are needed for each candidate TP. To overcome computational resource limits, a sub-set of TPs may be evaluated or fewer TPs will be inserted, but these options will lead to lower quality TPs or fewer TPs being inserted using conventional TP insertion methods.

SUMMARY

As indicated above, conventional methods of TPI are computationally intensive and prone to inaccuracies. To determine the fault coverage circuit-wide calculations must be performed for each candidate test point to evaluate the effect on fault coverage. Further determining the effect of some modern circuit nuances (e.g., reconvergent fan-outs) is so imprecise and difficult that conventional methods of TPI do not even account for them. It is desirable to continue exploring TPI methods which optimize the selection of higher-quality TPs with less computational resources, since reduced execution time translates to increased TPI efforts, which in turn translates to higher-quality TPs being inserted into a circuit in a given amount time. It is also desirable to explore TPI methods that accurately account for design nuances unique to modern technologies, such as reconvergent fan-outs, and adequately detect random pattern resistant faults accounting for random stimuli. In embodiments, an ideal system would be trained using training circuits with fault coverage determined through fault simulation, rather than heuristic based estimations, to learn to predict fault coverage in a given circuit and not require whole circuit calculations for each candidate TP. An ideal system and method would simulate optimized TP insertion and performance based on exact fault coverage of the circuit by considering the random nature of stimulus and overcome reconvergent fan-out miscalculations. Further, an ideal system and method would operate in a computationally expedient manner to allow for the determination of optimal placement of TPs.

Further, while TPI methods are known to increase RPR fault coverage for stuck-at faults, through inserting control test points and observe test points, control test points are known to block other faults found in modern technologies, such as delay faults.

Delay-causing faults become more common as semiconductor sizes scale, and the stuck-at fault model can no longer be the sole fault model for evaluating LBIST quality. Typically-implemented control TPs (i.e., control-0 points using AND gates and control-1 points using OR gates) may mask the propagation and excitation of delay faults when active. Two alternatives can mitigate delay-masking detriments, but both have drawbacks. First, observe points can be used exclusively, but exciting RPR faults may require forcing values in circuits and implementing observe points require expensive latches or output pins. Second, circuits can be tested with TPs both on and off. This is normal industry practice, but disabling TPs mitigates their purpose: ideally, active TPs can test RPR and delay faults simultaneously. Therefore, an ideal system and method would also be capable of optimizing TP insertion based minimizing masking delay faults.

In an embodiment, the invention is directed to a method and that generates training data from training circuits, trains a learning segment (which may include an artificial neural network (ANN)) using the training data generates, and then generates fault prediction models to predict the quality of a TP inserted on a given circuit location and optimize TPI for a given circuit.

In an embodiment, the present application is direct to a method for optimizing fault coverage for circuits. The method including, receiving a set of training circuit data, wherein the set of training circuit data includes at least one training circuit. Analyzing the training circuit data for each training circuit in the set training circuit data to generate a set of test data. The generation of test data includes selecting at least one candidate test point for the test circuit, performing fault simulation on the test circuit and candidate test point, and generating structured test data based on the test circuit, the candidate test point, and the fault simulation.

Training a learning segment on the set of test data to learn to predict a change in fault coverage based on the set of test data. Generating at least one fault coverage model based on the learning of the learning segment, where the at least one fault coverage model predicts the change in fault coverage for a circuit. Receiving new circuit data and determining a total fault coverage for the new circuit. Analyzing a current state of the new circuit to determine if a set of fault coverage optimization rules are achieved. Selecting a plurality of candidate test points for the new circuit, when the set of fault coverage optimization rules are not achieved. Applying the at least one fault coverage model to the selected plurality of candidate test points to determine change in fault coverage for the new circuit. Stimulating test point insertion for an optimized test point, wherein the optimized test point is the candidate test point that meets a set of test point insertion rules based on results of the application of the at least one fault coverage model to the plurality of candidate test points determining the total fault coverage for the simulated new circuit. Analyzing the current state of the simulated new circuit to determine if the set of fault coverage optimization rules are achieved and repeating the selecting, applying, simulating, and determining steps above until the set of fault coverage optimization rules are achieved. Displaying the simulated new circuit after the fault coverage optimizations rules are achieved.

Another embodiment of the present application is an automated computer system for optimizing fault coverage for circuits. The system includes a processor, at least one display and a non-transitory computer readable medium programmed with computer readable code that upon execution by the processor causes the processor to execute the above-mentioned method for optimizing fault coverage for circuits.

Another embodiment of the present application is a non-transitory computer readable medium programmed with computer readable code that upon execution by a processor causes the processor to execute the above-mentioned method for optimizing fault coverage for circuits.

The objects and advantages will appear more fully from the following detailed description made in conjunction with the accompanying drawings.

BRIEF DESCRIPTION OF THE DRAWING(S)

DETAILED DESCRIPTION OF THE DRAWING(S)

Figure 1:
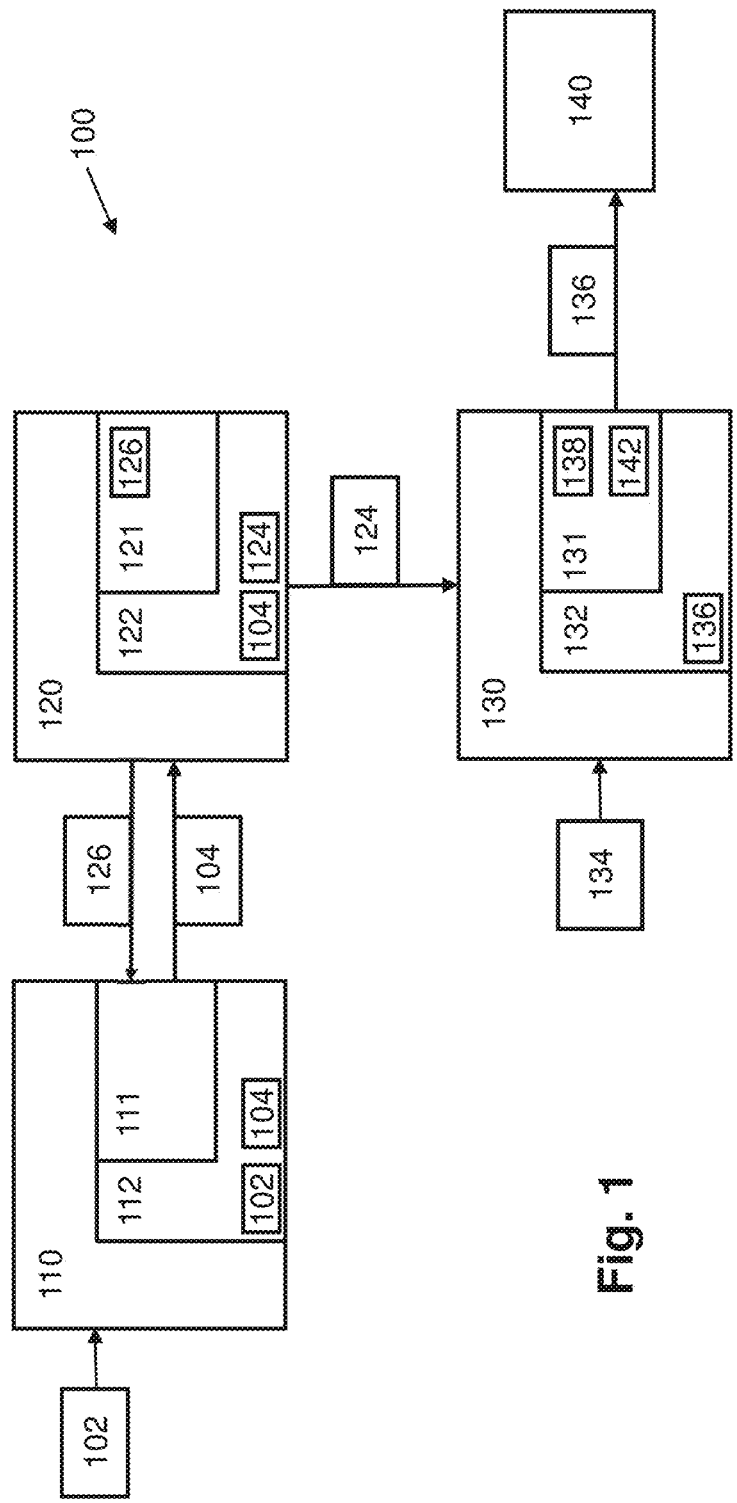
FIG. 1 depicts an exemplary embodiment of a TP insertion optimization system for training a learning segment to create fault prediction models to assist in optimizing test point insertion into new circuits.

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

As technology has advanced and the speed at which circuits work has become increasingly important, the importance of detecting stuck-at faults and delay faults in circuits has increased. Further, as technology has advanced, the traditional methods of detecting circuit faults have become inadequate due to inaccuracies and inabilities of these methods and due to excessive computation (CPU) time. The systems and methods described herein generates training data from training circuits (and in some embodiments generates training circuits), trains a learning module to create a fault coverage model(s), and then uses the fault coverage model(s), which predict the quality (change in fault coverage) of a TP inserted on a given circuit location for new circuit data, to produce simulated new circuits optimized for fault coverage based on optimized test point insertion. The learning segment may be trained on training data using fault simulation of inserting TPs (on arbitrary training locations or prescribed training locations) in the training circuits, with the goal of the learning segment being trained to provide accurate TP evaluations (including accounting for random stimuli and reconvergent fan-outs) with less computational effort. Using the training data, the learning segment will learn how to determine, for a candidate TP, the change in fault coverage on the circuit without performing fault simulation or circuit-wide impact calculations and generates fault coverage models for prediction of change in fault coverage for a given circuit. In an embodiment, the change in fault coverage may be expressed as $\Delta FC_{p,t}$. In another embodiment, the change in fault coverage may be expressed as the number of additional (or possibly fewer) faults detected in the circuit/sub-circuit when inserting a candidate test point. The prediction segment applies the fault coverage models to new circuit data to optimize TPI for the new circuit. In an embodiment, the system and methods may be connected to circuit generation systems/equipment and automatedly generate the optimized simulated circuit with optimized TPs.

In embodiments the systems and methods are capable of determining change in fault for stuck-at faults and/or for delay-faults. Further, the learning module may be trained to learn numerous fault coverage models including, but not limited to, change in stuck-at fault coverage under control-1 TPs, control-0 TPs, and observe TPs, change in delay fault coverage under control-1 TPs, control-0 TPs, and observe TPs, and any combination thereof. These fault models are applied to new circuit data and can accurately predict change in fault coverage for candidate test points without needing to conduct fault simulation. Based on the application of the fault coverage models, the prediction segment optimizes TPI for the new circuit data and optimizes fault coverage for the new circuit based on optimized TPI.

The systems and methods described herein provide several advantages over conventional TPI methods. First, the fault coverage models may be generated based on actual fault simulation training data which allows the fault coverage models to be more precise and account for nuances in modern circuits (e.g., reconvergent fan-outs and the correlation between circuit COP values and circuit topology) that conventional methods do not account for. Second, by training fault coverage models and applying them to new circuit data, computational (CPU/processing time) efficiency is increased. The circuit-wide calculations that are required for conventional methods for each candidate TP in a given circuit only need to be calculated once for all possible TPs for a given circuit in the disclosed methods and systems.

FIG. 1 depicts an exemplary embodiment of computerized TP insertion optimization system 100 for training a learning segment to create fault prediction models to assist in optimizing test point insertion into new circuits.

TP insertion optimization system 100 includes a training segment 110 having a training software module 111 and an optional training storage 112. Training segment 110 may be a processor or a combination of a processing system and a storage system. Training segment 110 receives training circuit data 102 from the TP insertion optimization system. The training segment 110 analyzes the received training circuit data 102 to create training data 104 for training a learning segment 120. The learning segment 120 may require training data 104 provided to it in a specified manner and configuration. Using the training software module 111, the training segment analyzes the received training circuit data and generates any training data 104 that is not included in the training circuit data 102 and converts the training circuit data 102 and any generated data into training data 104 for training the learning module 120. Optionally, the training segment generates its own training circuit data 102, which will be described in further detail below. Once the training data 104 is generated and configured, the training segment provides it to the learning segment 120. Optionally, training segment 110 may also pass a copy of the training circuit data 102 (received and optionally generated) and the training data 104 to internal or external training storage 112 or other storage for permanent or temporary storage. Optionally, the storage for the training data 104 may be a training database that maintains training data 104 in a searchable, filterable format. Optionally, the training circuit data 102 may be provided from a circuit database that maintains training circuit data 102 in a searchable, filterable format. Any training circuit data 102 generated by the training segment 110 or needing to be stored may be stored in the circuit database.

Training circuit data 102 is data depicting logical circuits for training the learning module to generate fault prediction models to predict fault coverage for candidate test points. Training circuit data includes an indication of all lines and gates in a test circuit and their relation in the test circuit. Training circuit data may also include candidate test points (including the location and type of test point—i.e. logic-1, logic-0, observe), fault coverage for the test circuit without any test points, fault coverage for the test circuit for each candidate test point, CC values for each line of the test circuit, and CO values for each line of the test circuit. CC values (controllabilities) are the controllability of a line, which indicated the probability each line in a circuit will be logic-1, which are generated in an inputs-to-outputs order using the input controllabilities of a gate and the gate type. CO values (observabilities) are the observability of a line, estimates the probability that a logic value on a line will be observed at a circuit output, which is generated in an outputs-to-inputs order using the output observability of a driven gate and the input controllability of other lines driving the gate.

Figure 5:
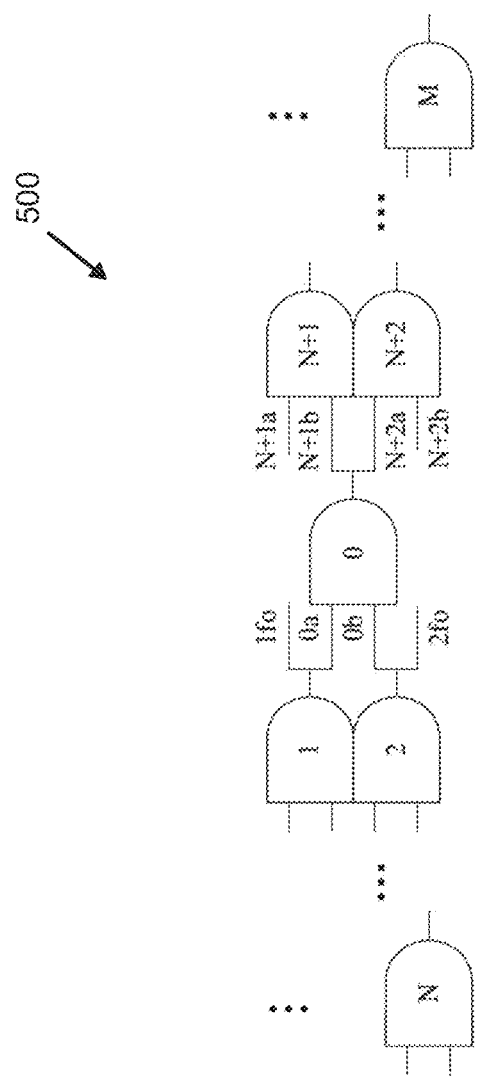
FIG. 5 depicts an exemplary embodiment of a training circuit.

Training data 104 includes all training circuit data 102 and generated data for training the learning segment 120 compiled in the prescribed format for the learning segment 120. The learning segment is trained using the training data 104 to generate fault prediction models that when applied to new circuit data can predict the change in fault coverage for candidate test point(s) to optimize test point insertion (TPI) for the new circuit. Therefore, it should be understood that the contents of the training data 104 will depend on the type of model the learning segment is being trained on (as further described in this application). The training data 104 includes an input portion and a desired output portion. The input portion may include candidate test point data (including an identification location and type), line data for the circuit, and gate data for the circuit. The output portion may include known change in fault coverage between the circuit without the test point and the circuit after TPI and activation using the candidate test point. For example, in one embodiment, the training data for one circuit or sub-circuit would include the candidate test point location, the CC values for each line, CO values for each line, and gate types for the training circuit/sub-circuit (together input values) and the desired output value. There are many ways gate types can be represented in the training data. In one embodiment, the gate type of nodes are represented using a "one-hot encoding" with each gate type having a separate encoding (e.g., "AND"=0001, "OR"=0010, etc.). Note that in this example and embodiment if more gate types or standard cells are used in a circuit, longer one-hot strings will be needed. In an embodiment, the learning segment may consist of one or more artificial neural networks (ANNs) which receive data input as an input vector. Referring to FIG. 5, circuit 500 is a sample circuit structured to provide data for an input vector to train an ANN(s). In embodiments where the learning segment includes one or more ANNs, the training data 104 may be provided to the learning segment as vector input(s) and/or vector input pair(s). The input vector(s)/input vector pair(s) for the ANN includes circuit/sub-circuit CC values, CO values, and gate types around a candidate TP location in the circuit/sub-circuit provided in a vectorized format. For example, the first value is the CC of the candidate TP location (location 0 in FIG. 5). This is followed by the CC of gate inputs (and fan-outs) feeding the TP location (e.g. the lines of the circuit leading into the candidate TP), then the CC of gate inputs (and fan-outs) feeding these gates, etc., in a breadth-first levelized order (e.g. the lines of the circuit leading into the lines of the circuit leading into the candidate TP—a.k.a. 2 levels before the candidate TP). This is repeated until the CC and CO values of lines from N gates are collected moving backwards in the circuit/sub-circuit. This process is then repeated starting at the candidate TP location moving forward in the circuit until the CC and CO values of lines from M gates are collected. In the input vector, CC values are followed by CO values in the same order. Finally, gate types of each gate in the circuit are recorded in the same order with their one-hot encoding. An example of the input vector for the circuit 500 shown in FIG. 5 can be written as $CC_0$, $CC_{1fo}$, $CC_{0a}$, $CC_{ob}$, $CC_{2fo}$, $CC_1$, $CC_2$, ..., $CC_{Nb}$, $CC_{N+1a}$, $CC_{N+1b}$, ..., $CC_{N+M-1}$, $CC_{N+M}$, $CO_0$, $CO_{1fo}$, $CO_{0a}$, $CO_{ob}$, $CO_{2fo}$, $CO_1$, $CO_2$, ..., $CO_{Nb}$, $CO_{N+1a}$, $CO_{N+1b}$, ..., $CO_{N+M-1}$, $CO_{N+M}$, Gate_0, Gate_1, Gate_2, ..., Gate_N, Gate_N+1, Gate_N+2, ..., Gate_N+M. N may be a predetermined number of gates in the test circuit/sub-circuit moving backwards from the candidate test point. M may be a predetermined number of gates in the test circuit/sub-circuit moving forwards from the candidate test point. The desired output will be provided separate from the input vectors. It should be understood that the above is an example of how the input vector for the ANN may be structured and should not be considered limiting.

When the training circuit data 102 does not include all of the training data 104 required by the learning segment (e.g., CC and CO values, candidate test points, fault coverage determinations), the training segment will generate the required data and configure it with the provided training circuit data 102 to generate training data 104. In embodiments where the learning segment includes at least one ANN, the training segment may generate input vectors/input vector pairs for sub-circuits of the training circuit data 102 to provide as training data 104. In ANN based embodiments, the training segment may convert the training circuit data into a consistent fan-in/fan-out structure. This is done because ANNs require input features to be of a constant order. In an embodiment, the training circuits are converted into a circuit structure of 2-inputs per gate and 2-fan-outs per gate. Once converted into a consistent structure, the training segment will generate CC and CO values for each line of the training circuit data 102 (if this information is not included in the training circuit data). The training segment 110, then extracts sub-circuits from the converted training circuit and identifies a candidate test point for each sub-circuit. It should be understood that this may occur in any order such that the sub-circuits are extracted and based on the extracted sub-circuit a candidate test point is determined or candidate test point(s) are determined and then sub-circuits are extracted based on the candidate test point(s). The training segment 110 performs fault simulation on the training circuit and the sub-circuits to determine fault coverage for each and determines the change in fault coverage. The training segment 110 then generates input vector(s) and/or input vector pairs(s) based on the generated circuit data and provides it to the learning segment 120 for training. It should be understood that even if the training circuit data 102 includes all of the data required by the learning segment 120 for training, that the training segment 110 may still perform the above to generate input vectors consisting of sub-circuits, rather than the entire circuit from the training circuit data 102.

In an embodiment, the training segment 110 may generate training circuit data 102 for transforming into training data 104. Many circuit developers are reluctant to share circuit information, which is needed to best train the learning segment. The training segment may generate training circuits by creating directed acyclic graphs (DAGs). DAGs can easily be converted into circuits because DAGs have directional edges and no path exists from any vertex to itself. The training segment converts a given DAG into a random binary circuit by 1) replacing all vertices of the DAG having no inputs with circuit inputs, 2) replacing all other vertices of the DAG with a randomly selected gate (or if it has 1 input, a buffer or inverter), and 3) replacing dead-end vertices with circuit outputs. In an embodiment, the training segment generates a DAG (to be converted into a circuit) based on the number of circuit inputs to create (I), the minimum number of circuit outputs to create ($O_{min}$), the maximum number of circuit levels (R), the maximum number of fan-ins per gate ($f_{max}$), and the desired number of nodes to create (N). The training segment creates "ranks" of vertices such that in the first rank no vertex has inputs, in the last rank no vertex has outputs, and every vertex in a rank r is connected randomly to vertices in previous ranks. By forcing the first rank to have I vertices, the last to have $O_{max}$, and all others to have (N–O)/R, when the DAG is converted to a circuit it is guaranteed that the circuit will have the correct number of inputs and a minimum number of outputs.

TP insertion optimization system 100 includes a learning segment 120 having a learning software module 121 and an optional learning storage 122. Learning segment 120 may be a processor or a combination of a processing system and a storage system. Learning segment 120 receives training data 102 from the training segment 110. As indicated above, the training data 102 includes an input portion (e.g., circuit data with candidate test point) and a desired known output portion (e.g., known change in fault coverage). Using the learning software module 121, the learning segment 120 analyzes the received training data 104 and learns how to predict the change in fault in a given circuit and a given candidate test point. When the learning segment 120 is sufficiently trained, the learning segment will generate a fault coverage model(s) 124. The fault coverage model(s) 124 can be used to predict change in fault for a given circuit and candidate test point. Optionally, the learning segment 120 may include model type rules 126 that may be provided to the training segment 110 to direct the training segment to produce training data 104 directed to a particular type of fault coverage model 124 or to direct the training segment 110 to provide training data 104 directed to a particular type of fault coverage model 124. Optionally, learning segment 120 may use model type rules 126 to direct the type of fault coverage model 124 to which the training data 104 should be applied. Optionally, learning segment 120 may also pass a copy of the training data 104 and the fault coverage models 124 to internal or external learning storage 122 or other storage for permanent or temporary storage. The learning segment 120 may be considered to be sufficiently trained to generate a particular fault prediction model 124 when the mean square error has reached a predetermined value. In another embodiment, the learning segment 120 may be considered sufficiently trained once a certain amount of training data 104 has been processed for the fault coverage model 124 to be generated.

In an embodiment, the learning segment will learn to predict change in fault coverage using one or more artificial neural network(s) (ANNs). The ANNs use the input portion of the training data 104 to learn to produce the desired (known) output (e.g., change in fault coverage for a candidate test point). The ANN receives the input values and teaches itself to generate the desired output value by automatedly modifying the weight and bias of its dendrites to produce the desired output values for the training data 104. Accordingly, the input of the ANNs is circuit data and the output is the impact on fault coverage a test point has on a circuit when inserted and activated. In an embodiment, the learning segment 120 may include one ANN or it may include multiple ANNs for training. In embodiments that include more than one ANN, each ANN may be trained on different training data 104 and may be trained to generate different fault coverage models 124. For example, ANNs may be based on type of fault coverage to be determined (e.g., stuck-at fault coverage, delay fault coverage). In another example, ANNs may be based on the test point type (e.g., control-1, control-0, observe). In another example, each ANN may be specialized for generating a singular type of fault coverage model 124. In embodiments with one ANN, the one ANN is trained to generate all required fault coverage model(s) 124. In embodiments where the ANN(s) are trained to determine delay fault coverage, the training data 104 is generated with vector pairs: one vector to set the initial state and another vector to launch the circuit transition. In embodiments with a single ANN or where the learning module needs to know the type of test point inserted in the training data, that information will be provided in the training data set.

In an embodiment, change in fault coverage may be expressed as $\Delta FC_{p,t}$. In another embodiment, the change in fault coverage may be expressed as the number of additional (or possibly fewer) faults detected in the circuit/sub-circuit when inserting a candidate test point. The difference between these embodiments is important when training the ANN (particularly when using sub-circuits), generating fault coverage models 124, and applying the fault coverage models 124 to sub-circuits. The number of faults output more accurately models the impact of "partial" sub-circuits: two TPs on two separate sub-circuits can have the same impact on sub-circuit fault coverage (e.g., +10%), but one sub-circuit may have more faults than the other, thus making the sub-circuit with more faults the better choice. If a TP will decrease the number of faults detected (by masking faults), the output is a negative number.

Fault coverage models 124 are models that can predict the fault coverage for new candidate test points in a given circuit. In an embodiment the learning segment will create at least one fault coverage model for each type of fault model the learning segment is trained for and each type of output the learning segment is trained for. In embodiments where the learning segment includes one or more ANNs, a fault coverage model is essentially the ANN that has trained itself to contain the proper weights and biases for its dendrites such that the ANN predicts (outputs) the anticipated change in fault coverage for the test circuit within an acceptable amount of error. It should be understood that each fault coverage model will be a model for the type of test point and type of fault coverage output (prediction) the ANN is trained for. Different fault coverage model(s) 124 may include change in stuck-at fault coverage under control-1 TPs, control-0 TPs, and observe TPs, change in delay fault coverage under control-1 TPs, control-0 TPs, and observe TPs, and any combination thereof. It should be understood that these are merely examples of fault coverage models 124 and that these fault coverage models 124 may be combined, and mixed and matched, and should not be considered limiting.

Model type rules 126 are instructions that may be provided to the training segment 110 or the learning segment 120 that indicate the type of training data 104 to generate and/or train on. The Model type rules 126 may be pre-determined or dynamically determined. For example, the model type rules 126 may instruct the training segment 110 to generate certain types of training data 104 (e.g., stuck-at faults, delay faults, control-1, control-0, observe, etc.) for a particular quantity or a particular processing period. Or the model type rules 126 may instruct the learning segment to apply certain types of training data 104 for a particular quantity or a particular processing period. Alternatively, the model type rules 126 may instruct the training segment 110 to generate (or the learning segment 120 train on) a particular type of training data 104 based on the state at which the learning segment is trained for a particular type of training data 104. For example, if the learning segment still has an unacceptable mean square error for stuck-at fault coverage, the model type rules 126 may instruct the training segment to generate more training data for stuck-at fault training or may instruct the learning segment 120 to train on more stuck-at fault training data 104. The above are merely examples of model type rules 126 and should not be considered limiting.

TP insertion optimization system 100 includes a prediction segment 130 having a prediction software module 131 and an optional prediction storage 132. Prediction segment 130 may be a processor or a combination of a processing system and a storage system. Prediction segment 130 receives new circuit data 134 to optimize test point insertion to optimize fault coverage for the new circuit data 134 by applying fault coverage model(s) 124 from the learning segment 120. Once optimized the prediction segment 130 provides a simulation of the optimized circuit 136 (which includes optimized test point insertions). Using the prediction software module 131, the prediction segment analyzes the received new circuit data 134 to determine the total fault coverage for the new circuit data 134. The total fault coverage for the new circuit data 134 is compared to a set of fault coverage optimization rules 138. Once the fault coverage optimization rules 138 are achieved, the prediction segment 130 generates an optimized circuit 136. Until the fault coverage optimization rules 138 are achieved, the prediction segment 130 performed optimized test point insertion on the new circuit data 134 by applying the fault coverage model(s) 124 and simulating optimized test point insertion on the new circuit data 134 based on the application of the fault coverage model(s) 124. Once the optimized circuit 136 is simulated, the prediction segment 130 provides it to the TP insertion optimization system 100 for optimized test point insertion into the given circuit. This may include providing the optimized circuit 136 directly to the system or another system in such a manner that the system automatedly performs the TPI on a physical circuit as instructed by the simulated optimized circuit 136. Optionally, prediction segment 130 may also pass a copy of the optimized circuit 136 to internal or external prediction storage 132 or other storage for permanent or temporary storage or to a user desktop 140 for analysis and review and/or accuracy determinations.

In an embodiment, to determine the total fault coverage of the new circuit data 134, the prediction segment 130 generates CC and CO values for each line of the new circuit data 134. In an embodiment, test point insertion optimization includes processing the new circuit data 134 in a similar manner as described above for processing training circuit data 102 to produce training data 104 in that the new circuit data 134 may be converted into a consistent fan-in/fan-out structure and sub-circuits will be extracted from the consistent new circuit data. In an embodiment, for every line in the new circuit data 134, a sub-circuit is extracted with a candidate test point for each line. The prediction segment 130 then applies the applicable fault coverage models 124 to each sub-circuit, such that the application of the fault coverage model(s) 124 to the new circuit data 134 will produce a prediction of the change in fault coverage for a test point insertion of a candidate test point for each extracted sub-circuit. Therefore, in an embodiment, the fault coverage model(s) are applied to every possible candidate test point (i.e., a sub-circuit is extracted for every line in the new circuit, which creates a sub-circuit and candidate test point for every line). In this embodiment processing time is minimized since all test points share the same pre-insertion CC and CO values, they only need to be calculated once to evaluate all potential test point locations at the same time and identify a test point insertion. This is unlike traditional heuristic test point insertion determinations which required re-calculating the values for each candidate test point evaluation, which may not result in a test point insertion in feasible computation time. By performing CC and CO analysis once per TP insertion as opposed to once per TP evaluation (as required by traditional heuristic methods), this reduces TP evaluation processing time (CPU time) from $O(G)$ to $O(1)$, which reduces the time to select a single TP from $O(T'\cdot G)$ to $O(T')$, where G is the number of gates in the circuit and T' is the number of candidate test points in the circuit. Once the change in fault coverage is determined for the sub-circuits, the prediction segment 130 compares the change in fault coverage for the candidate test points to a set of test point insertion rules 142 and simulates TPI for the candidate test point(s) determined by the test point insertion rules 142. After each simulated TPI the prediction segment 130 determines the total fault coverage for the new circuit data 134 with the simulated TPI, which is then compared to the fault coverage optimization rules 138 to determine if the new circuit has been optimized.

The optimized circuit 136 is the new circuit data 134 including all simulated TPIs from the test point optimization. The optimized circuit will include all lines and gates for the circuit indicating their relation and all simulated test points to optimize the fault coverage for the circuit, including the location and type of TP.

Fault coverage optimization rules 138 are instructions that determine when new circuit data 134 has achieved optimized fault coverage. The fault coverage optimization rules 138 may be predetermined or may be dynamically determined. Examples of fault coverage optimization rules 138 may include but are not limited to, optimized fault coverage is achieved when (1) the number of TPs inserted reaches a pre-designated limit; (2) the predicted total fault coverage reaches a pre-designated limit; (3) no TPs from step 220 below are inserted because no TPs from step 220 below are predicted to increase fault coverage; or (4) a processing/CPU time limit is reached. Examples of fault coverage optimization rules may include if the total fault coverage for the new circuit is at a satisfactory level (i.e., equal to or greater than a predetermine percentage of fault coverage or depending on the details of the circuit a dynamically determined percentage of fault coverage) the fault coverage for the new circuit is optimized. Another example of a fault coverage optimization rule may be if there were no test points inserted in this interaction (e.g., the test points in the current iteration of the new circuit are the same as the test points in the previous iteration of the new circuit because no test point was determined to increase the fault coverage or no test point met the conditions for TPI simulation, etc.) the fault coverage for the new circuit is optimized. In other words, no test point was predicted to increase the fault coverage for the new circuit. In another example, a fault coverage optimization rule may indicate that if a certain number of test points have been inserted that fault coverage for the new circuit is optimized. This number of test points may be a predetermined number, may be based on the type of circuit, may be dynamically determined based on other fault coverage optimization rules, etc. Another example of a fault coverage optimization rule may be based on the amount of computation time the system has expended optimizing the fault coverage for the circuit. It should be understood that these are merely examples of fault coverage optimization rules and should not be limiting. Dynamically determined fault coverage optimization rules 138 may include determinations based on the total processing needed to continue optimization based on the amount of processing required by other programs/applications in the system, etc.

The test point insertion rules 142 are instructions to determine which candidate test points should be simulated in the new circuit data 134 to optimize the fault coverage. For example, in an embodiment, a single test point is inserted at the candidate test point for the sub-circuit where the greatest change in fault coverage is predicted (which test point is determined to have the greatest change in fault coverage will, of course, depend on the fault test model(s) applied to the circuit/sub-circuit data). In other words, a test point of the appropriate type is inserted on the line of the new circuit where the prediction model(s) have determined insertion will increase fault coverage the most. The test insertion rules may indicate that the candidate test point that the fault prediction model(s) indicated will have the greatest change in fault coverage will be inserted. In an embodiment, if no candidate test point is predicted to increase fault coverage in the circuit, then no test point is inserted into the new circuit. The test point insertion rules may include a rule that only candidate test points predicted to increase fault coverage may be inserted. In another embodiment, one or more test point(s) may be inserted at the candidate test point for each sub-circuit where the change in fault coverage exceeds or meets a predetermined amount. For example, the prediction model(s) may determine that more than one candidate test point will increase fault coverage by the same amount. In an embodiment, a test point may be inserted into the new circuit for all lines where the change in fault coverage is predicted to the same or at all points where the change in fault coverage is predicted to be greater than a set amount or percentage. It should be understood that the above are only examples and should not be considered limiting. It should be understood that an eligible test point insertion is only available for lines existing in the unconverted new circuit data. Lines that are added as "default" lines in the circuit/sub-circuit for model application are not eligible for test point insertion. Default lines are described further herein.

TP insertion optimization system 100 includes at least one user device/desktop 140 which can be used by a user for reviewing optimized circuits 136, training circuit data 102, training data 104, fault coverage models 124 and performing analysis and error assessment on the same. The user desktop 140 can also be used to review, provide, and update rules 126, 138, and 142.

It should be understood that while the above system 100 is described as a single integrated system each segment (training, learning, and prediction) could be a completely separate system and can be operated independent and separate from the other processing systems.

Figure 2:
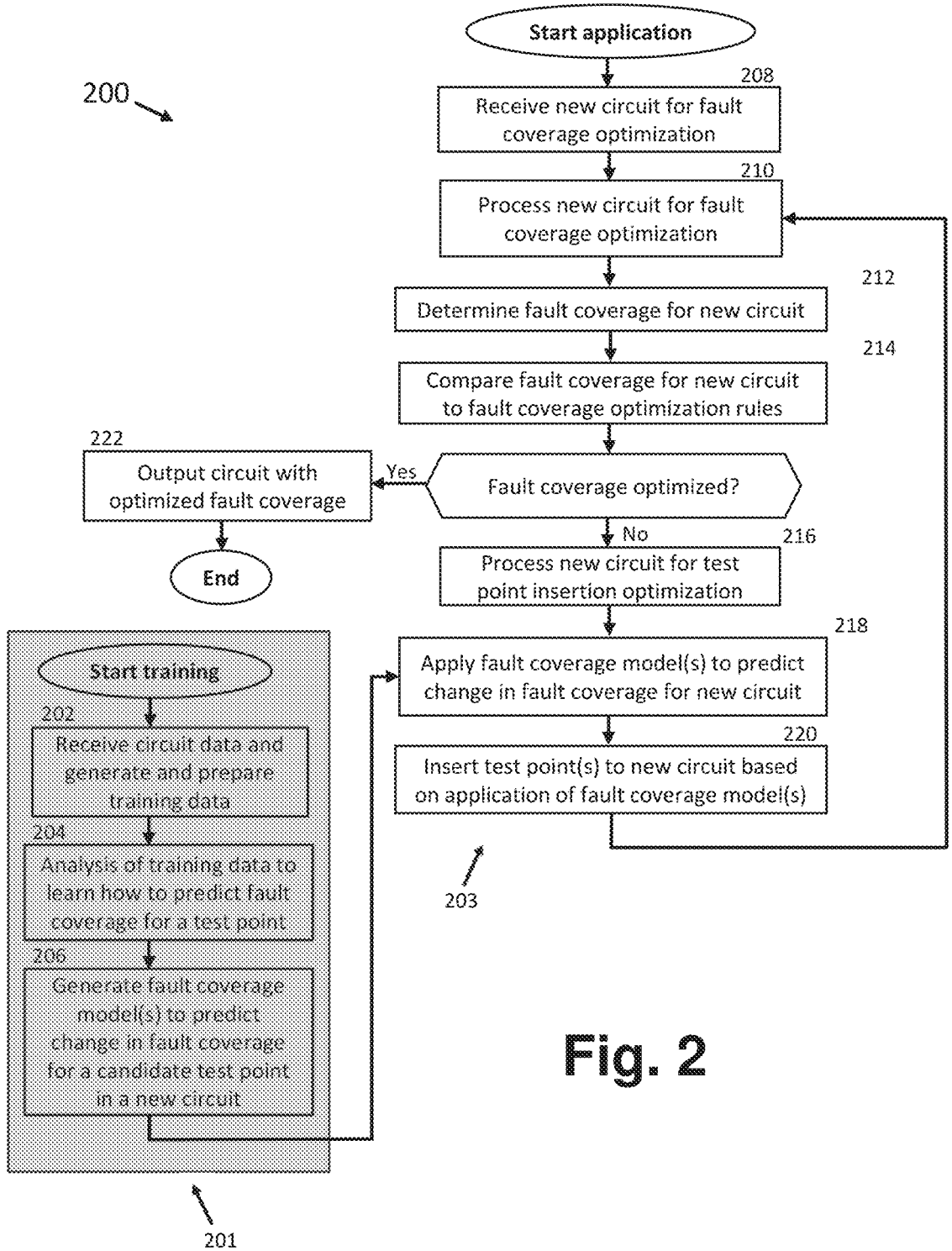
FIG. 2 depicts a flowchart of an exemplary embodiment of a TP insertion optimization method for training a learning segment to create fault prediction models to assist in optimizing test point insertion into new circuits.

FIG. 2 depicts a flowchart of an exemplary embodiment of method 200 for optimizing test point insertion determinations for logic circuits. The flowchart of FIG. 2 can generally be separated into two portions, a training portion 201 in which fault coverage models are created, and an application portion 203 wherein the system applies the fault coverage model(s) to new circuits to optimize the insertion of test points into the new circuit.

Starting with the training portion 201, at step 202, a training segment will receive training circuit data for processing and preparation to train a learning segment to generate prediction models to predict the quality of a TP in a given circuit. The training segment will prepare (and optionally generate) training data to be input into the learning segment. The training data will train the learning segment to simulate and predict change in fault coverage for candidate test points in a given circuit. The training data can include any circuit data that will aid in training the learning segment to predict fault coverage for circuits based on different fault models for determining the fault coverage of a circuit (for example stuck-at fault coverage and delay fault coverage). It should be understood that predicting fault coverage based on different fault models may require different training data and/or a different structure to the training data. In an embodiment the training circuit data received may be any circuit data for any circuit with a known or determinable solution. In an embodiment, the training circuit data received will be directed to a specific type of model for the learning segment to learn. For example, the training circuit data may be specifically provided to assist the learning segment to generate specific models (e.g., at-fault models and delay fault models under observation TPs, control-1 TPs, control-0 TPs, or a combination thereof).

The training segment will prepare (and optionally generate) the appropriate training data based on the training to be performed on the learning segment. For example, in one embodiment, the training data for one circuit or sub-circuit would include the candidate test point location, the CC values for each line, CO values for each line, and gate types for the training circuit/sub-circuit (together input values) and the desired output value. CC values (controllabilities) are the controllability of a line, which indicated the probability each line in a circuit will be logic-1, which are generated in an inputs-to-outputs order using the input controllabilities of a gate and the gate type. CO values (observabilities) are the observability of a line, estimates the probability that a logic value on a line will be observed at a circuit output, which is generated in an outputs-to-inputs order using the output observability of a driven gate and the input controllability of other lines driving the gate. There are many ways gate types can be represented in the training data. In one embodiment, the gate type of nodes are represented using a "one-hot encoding" with each gate type having a separate encoding (e.g., "AND"=0001, "OR"=0010, etc.). Note that in this example and embodiment if more gate types or standard cells are used in a circuit, longer one-hot strings will be needed.

In an embodiment, the learning segment may consist of one or more artificial neural networks (ANNs) which receive data input as an input vector. Referring to FIG. 5, circuit 500 is a sample circuit structured to provide data for an input vector to train an ANN(s). In an embodiment, the input vector for the ANN includes circuit/sub-circuit CC values, CO values, and gate types around a candidate TP location in the circuit/sub-circuit provided in a vectorized format. For example, the first value is the CC of the candidate TP location (location 0 in FIG. 5). This is followed by the CC of gate inputs (and fan-outs) feeding the TP location (e.g. the lines of the circuit leading into the candidate TP), then the CC of gate inputs (and fan-outs) feeding these gates, etc., in a breadth-first levelized order (e.g. the lines of the circuit leading into the lines of the circuit leading into the candidate TP—a.k.a. 2 levels before the candidate TP). This is repeated until the CC and CO values of lines from N gates are collected moving backwards in the circuit/sub-circuit. This process is then repeated starting at the candidate TP location moving forward in the circuit until the CC and CO values of lines from M gates are collected. In the input vector, CC values are followed by CO values in the same order. Finally, gate types of each gate in the circuit are recorded in the same order with their one-hot encoding. An example of the input vector for the circuit 500 shown in FIG. 5 can be written as $CC_0$, $CC_{1fo}$, $CC_{0a}$, $CC_{ob}$, $CC_{2fo}$, $CC_1$, $CC_2$, ..., $CC_{Nb}$, $CC_{N+1a}$, $CC_{N+1b}$, ..., $CC_{N+M-1}$, $CC_{N+M}$, $CO_0$, $CO_{1fo}$, $CO_{0a}$, $CO_{ob}$, $CO_{2fo}$, $CO_1$, $CO_2$, ..., $CO_{Nb}$, $CO_{N+1a}$, $CO_{N+1b}$, ..., $CO_{N+M-1}$, $CO_{N+M}$, Gate_0, Gate_1, Gate_2, ..., Gate_N, Gate_N+1, Gate_N+2, ..., Gate_N+M. N may be a predetermined number of gates in the test circuit/sub-circuit moving backwards from the candidate test point. M may be a predetermined number of gates in the test circuit/sub-circuit moving forwards from the candidate test point. It should be understood that the above is an example of how the input vector for the ANN may be structured and should not be considered limiting.

It should be understood that the CC and CO values for the input vector are the same values used by other conventional TPI algorithm, however; the ANN only needs pre-TP insertion values, which forgoes the need to re-calculate CC and CO values for every candidate TP and decreases TP evaluating time. It should also be understood that the training data should include "good" test point insertion and "poor" test point insertion samples as the learning module needs to learn from both to learn optimized test point insertion.

Additional process and details regarding step 202 and the process for preparation of training data for leaning segment embodiments that include at least one ANN can be found in FIG. 4 and the method 400 description below. In an embodiment, the learning module is trained using the fault-simulated effect of inserting test points on arbitrary training locations in the training circuit data and providing the known results of the change in fault coverage for the test point insertion.

At step 204, once the training data is prepared, it is received by the learning segment to train the learning segment to learn how to predict fault coverage for a circuit. The learning segment analyzes the training data to learn how to predict the change in fault coverage for new candidate test points in a given circuit. In one embodiment, the learning segment uses an artificial neural network (ANN) to learn, using the training data, and predict the change in fault coverage for a candidate test point. The ANN receives the input values and teaches itself to generate the desired output value by automatedly modifying the weight and bias of its dendrites to produce the desired output values for the training data. Accordingly, the input of the ANNs is circuit data and the output is the impact on fault coverage a test point has on a circuit when inserted and activated. In an embodiment, the change in fault coverage may be expressed as $\Delta FC_{p,t}$. In another embodiment, the change in fault coverage may be expressed as the number of additional (or possibly fewer) faults detected in the circuit/sub-circuit when inserting a candidate test point. The difference between these embodiments is important when training the learning segment and applying the fault coverage models to sub-circuits. The number of faults output more accurately models the impact of "partial" sub-circuits: two TPs on two separate sub-circuits can have the same impact on sub-circuit fault coverage (e.g., +10%), but one sub-circuit may have more faults than the other, thus making the sub-circuit with more faults the better choice. If a TP will decrease the number of faults detected (by masking faults), the output is a negative number.

In an embodiment, the ANN performs testability analysis (e.g. determines the fault coverages) on a circuit/sub-circuit both before and after a test point is inserted into the circuit/sub-circuit to determine the change in fault coverage, without needing to perform fault simulation or whole-circuit calculations. In another embodiment, the learning segment may implement more than one ANN to be trained on different sets and training data. These different ANNs may be based on type of fault coverage to be determined or other factors. For example, the system may train one ANN to predict and determine fault coverage for stuck-at fault coverage and train a second ANN to predict and determine fault coverage for delay fault coverage. In another example, one ANN may be trained to predict and determine both stuck-at fault coverage and delay fault coverage. In the above examples and embodiments, the input vector for the ANN will need to include a test point type to indicated what type of test point was inserted into the test data: a control-0 test point, a control-1 test point, or an observe test point. In embodiments where the ANN(s) are trained to determine delay fault coverage, the input vector will be a pair of input vectors: one to set the initial state and another to launch the circuit transition. In embodiments with a single ANN or where the learning module needs to know the type of test point inserted in the training data, that information will be provided in the training data set.

As discussed above, TPs can block delay faults from propagating through a circuit or from being excited, and test point insertion optimization should try to prevent this. In an embodiment, the ANN is trained to target TP locations that increase delay fault coverage as much as possible when using conventional TP architectures (i.e., control and observe points). In this embodiment, the ANN is trained to learn weights and biases for its dendrites to predict the change in delay faults detected. To accomplish this, the training data provided to the learning segment is adapted to teach the ANN to output transition delay fault, rather than stuck-at fault.

In yet another example, to make the ANN training process simpler, three separate, smaller ANNs will be trained representing each of the test point insertion types: control-0, control-1, and observe TPs. When training the 3 ANNs each will only receive training data applicable to the type of test point present in the training data. For example, if the test point inserted into the circuit/sub-circuit is a observe test point, the training data for that test circuit/sub-circuit will be provided to the observe ANN. The same holds true for the other two ANNs. This embodiment reduces the size of each ANN and the processing time to train each ANN.

It should be understood that the ANN(s) are composed of input layers, hidden layers, and output layers. Each layer $l \in L$ contains $|N_l|$ neurons, with the number of neurons in the input (first) and output (last) layer being equal to the number of input "features" and "outputs" of the ANN, respectively. Neurons are connected with "dendrites", and each dendrite has a weight "w;" and a bias "b;" assigned to it. Each neuron has an "activation function", $f$ (a.k.a., a "transfer function"), which determines its output based on the sum of incoming signal values multiplied by dendrite weights and added biases. For example, $x_n = f(\Sigma_{\forall i \in N_n} x_i w_i + b_i)$ where $N_n$ are all neurons which are inputs to the neuron n. Evaluating an ANN for a vector of input features is done using a simple depth-order evaluation of neuron outputs. Based on the training data (input vectors of test circuits (or pairs of input vectors for test circuits for delay fault training) and known output solutions) the ANN(s) train themselves to generate a set of dendrite weights and biases that produce the desired output based on the test circuit input, minimizing the difference between the ANN output and known-solved outputs for given set of test data (test circuits with known solutions). An ANN can find relations between values during training which heuristic algorithms may not take advantage of. For instance, the known issue of CC and CO values not considering fan-outs is ignored by other TPI algorithms, but a trained ANN can find and act on such nuances automatically. Given sufficient training data (e.g., by providing the ANN with may CC and CO values near a test point) the ANN can detect similar values and deduce circuit structures to predict accordingly by finding correlations between data and discarding irrelevant data.

There are many ANN structures and hyperparameters to choose from for training, including the ANN topology (convolutional, deep neural networks, fully/sparsely connected, etc.), the number of neurons, the number of hidden layers, neuron activation functions, etc. which all affect the training time and accuracy of the training. Additionally, training parameters and effort significantly influence the ANN quality. In an embodiment, the ANN(s) may include two hidden layers with 128 neurons in the first layer and a single neuron in the second layer using the ReLU activation function. In an embodiment, the ANN(s) may include two hidden layers with a varying number of neurons in the first hidden layer and one neuron in the second hidden layer using a sigmoid activation function. These structures should just be understood as examples of an ANN structure and should not be considered limiting. It should also be understood that determining when an ANN is sufficiently trained is a tradeoff between computation (training) time, quantity of training data required, and accuracy. However, it should also be understood that too much training or non-diverse training could bias the ANN. In an embodiment, an ANN is considered trained when the ANN mean squared error ceases to decrease through computational effort. In an embodiment, the ANN may be considered trained after 10,000 to 12,000 training sub-circuits are processed. It should be understood that this is merely an example and should not be limiting. It should also be understood that the structure of the ANN may affect the amount of test data required before the ANN is considered trained.

At step 206, once the learning segment is trained on test data it generates fault coverage model(s) that can predict the fault coverage for new candidate test points in a given circuit. In an embodiment the learning segment will create at least one fault coverage model for each type of fault model the learning segment is trained for and each type of output the learning segment is trained for. In embodiments where the learning segment includes one or more ANNs, a fault coverage model is essentially the ANN that has trained itself to contain the proper weights and biases for its dendrites such that the ANN predicts (outputs) the anticipated change in fault coverage for the test circuit within an acceptable amount of error. It should be understood that each fault coverage model will be a model for the type of test point and type of fault coverage output (prediction) the ANN is trained for.

Once the fault coverage model(s) are established, they can be used in the application portion 203 as shown in FIG. 2. In the application portion 203, the prediction models are applied to new circuits with new candidate test points in order to determine the fault coverage for candidate test points and determine test point insertion to optimize the fault coverage in the new circuit.

At step 208, new circuit data is received for a new circuit to determine fault coverage optimization. The new circuit data will include all information needed for the system to know the full structure and organization of the circuit. In one embodiment the new circuit data will include circuit lines, circuit gates and how circuit lines and circuit gates are interconnected. This data may be represented in any manner the system is configured to understand. For example, a circuit can be represented as a netlist of interconnected nodes, where each node represents a gate type (AND, NAND, etc.), all nodes which are circuit inputs/outputs, and the inputs/output connections of all nodes. Many industry standard formats exist for such netlists (e.g., Verilog), but as long as the connection of gates and the gate types are represented, the circuit can be used. In an embodiment, the new circuit data will be for a circuit that does not have any pre-inserted test points. In another embodiment, the new circuit data may contain initially inserted test points or pre-existing test points.

At step 210, the new circuit data is analyzed and prepared for fault coverage prediction. In an embodiment, the analysis and preparation includes generating CC values and CO values for each line of the new circuit.

At step 212, the prediction segment determines the total fault coverage for the new circuit using the generated CC and CO values.

At step 214, the total fault coverage of the new circuit is analyzed against fault coverage optimization rules to determine if the total fault coverage meets the optimization requirements. The fault coverage optimization rules determine if optimized fault coverage is achieved for the new circuit. The fault coverage optimization rules may be pre-determined or may be dynamic. In an embodiment, optimized fault coverage is achieved when (1) the number of TPs inserted reaches a pre-designated limit; (2) the predicted total fault coverage reaches a pre-designated limit; (3) no TPs from step 220 below are inserted because no TPs from step 220 below are predicted to increase fault coverage; or (4) a processing/CPU time limit is reached. Examples of fault coverage optimization rules may include if the total fault coverage for the new circuit is at a satisfactory level (i.e., equal to or greater than a predetermine percentage of fault coverage or depending on the details of the circuit a dynamically determined percentage of fault coverage) the fault coverage for the new circuit is optimized. Another example of a fault coverage optimization rule may be if there were no test points inserted in this interaction (e.g., the test points in the current iteration of the new circuit are the same as the test points in the previous iteration of the new circuit because no test point was determined to increase the fault coverage or no test point met the conditions for TPI simulation, etc.) the fault coverage for the new circuit is optimized. In other words, no test point was predicted to increase the fault coverage for the new circuit. In another example, a fault coverage optimization rule may indicate that if a certain number of test points have been inserted that fault coverage for the new circuit is optimized. This number of test points may be a predetermined number, may be based on the type of circuit, may be dynamically determined based on other fault coverage optimization rules, etc. Another example of a fault coverage optimization rule may be based on the amount of computation time the system has expended optimizing the fault coverage for the circuit. It should be understood that these are merely examples of fault coverage optimization rules, and should not be limiting.

If the fault coverage optimization requirements have not been met, at step 216, the new circuit data is processed for test point insertion optimization. In an embodiment, the new circuit data is prepared similar to the training circuit data in step 202 above, except the new circuit data will not have a known solution associated with the circuit data. In embodiments, the analysis and preparation includes converting the new circuit data into a consistent fan-in/fan-out structure (i.e. gate input and output structure) as described in step 402 below and, for every line in the new circuit, a sub-circuit is extracted and created about the line similar to step 406 below. In an embodiment, candidate test points may be inserted for every possible location of the original new circuit data for each type of test point possible (e.g., control-1, control-0, observe) for the insertion location and a sub-circuit is extracted for each candidate test point.

At step 218, the fault coverage model(s) are applied to the new circuit data to predict change in fault coverage for candidate test points in the new circuit. In an embodiment, the fault coverage model(s) are applied to each sub-circuit, such that the application of the fault coverage model(s) to the new circuit will produce a prediction of the change in fault coverage for a test point insertion of a candidate test point for each sub-circuit. Therefore, in an embodiment, the fault coverage model(s) are applied to every possible candidate test point (i.e. a sub-circuit is extracted for every line in the new circuit, which creates a sub-circuit and candidate test point for every line). In this embodiment processing time is minimized since all test points share the same pre-insertion CC and CO values, they only need to be calculated once to evaluate all potential test point locations at the same time and identify a test point insertion. This is unlike traditional heuristic test point insertion determinations which required re-calculating the values for each candidate test point evaluation, which may not result in a test point insertion in feasible computation time. By performing CC and CO analysis once per TP insertion as opposed to once per TP evaluation (as required by traditional heuristic methods), this reduces TP evaluation processing time (CPU time) from $O(G)$ to $O(1)$, which reduces the time to select a single TP from $O(T' \cdot G)$ to $O(T')$, where G is the number of gates in the circuit and T' is the number of candidate test points in the circuit.

At step 220, test point insertion is simulated on the new circuit for the test point(s) based on the application of the fault prediction model(s) and test point insertion rules. The new circuit data with the simulated test point insertion(s) is returned back to step 210 for further processing. The new circuit data will include an indication of where a test point was inserted and what type of test point was inserted. Further, if no test point was inserted, that will be indicated too. Test point insertion rules indicate under what conditions a test point should be inserted and simulated on the new circuit. For example, in an embodiment, a single test point is inserted at the candidate test point for the sub-circuit where the greatest change in fault coverage is predicted (which test point is determined to have the greatest change in fault coverage will, of course, depend on the fault test model(s) applied to the circuit/sub-circuit data). In other words, a test point of the appropriate type is inserted on the line of the new circuit where the prediction model(s) have determined insertion will increase fault coverage the most. The test insertion rules may indicate that the candidate test point that the fault prediction model(s) indicated will have the greatest change in fault coverage will be inserted. In an embodiment, if no candidate test point is predicted to increase fault coverage in the circuit, then no test point is inserted into the new circuit. The test point insertion rules may include a rule that only candidate test points predicted to increase fault coverage may be inserted. In another embodiment, one or more test point(s) may be inserted at the candidate test point for each sub-circuit where the change in fault coverage exceeds or meets a predetermined amount. For example, the prediction model(s) may determine that more than one candidate test point will increase fault coverage by the same amount. In an embodiment, a test point may be inserted into the new circuit for all lines where the change in fault coverage is predicted to the same or at all points where the change in fault coverage is predicted to be greater than a set amount or percentage. It should be understood that the above are only examples and should not be considered limiting. It should be understood that an eligible test point insertion is only available for lines existing in the unconverted new circuit data. Lines that are added as "default" lines in the circuit/sub-circuit for model application are not eligible for test point insertion.

If at step 214, it is determined that fault coverage for the new circuit has been optimize, at step 222, the new circuit is output with optimized fault coverage including any simulated inserted test point(s).

Figure 4:
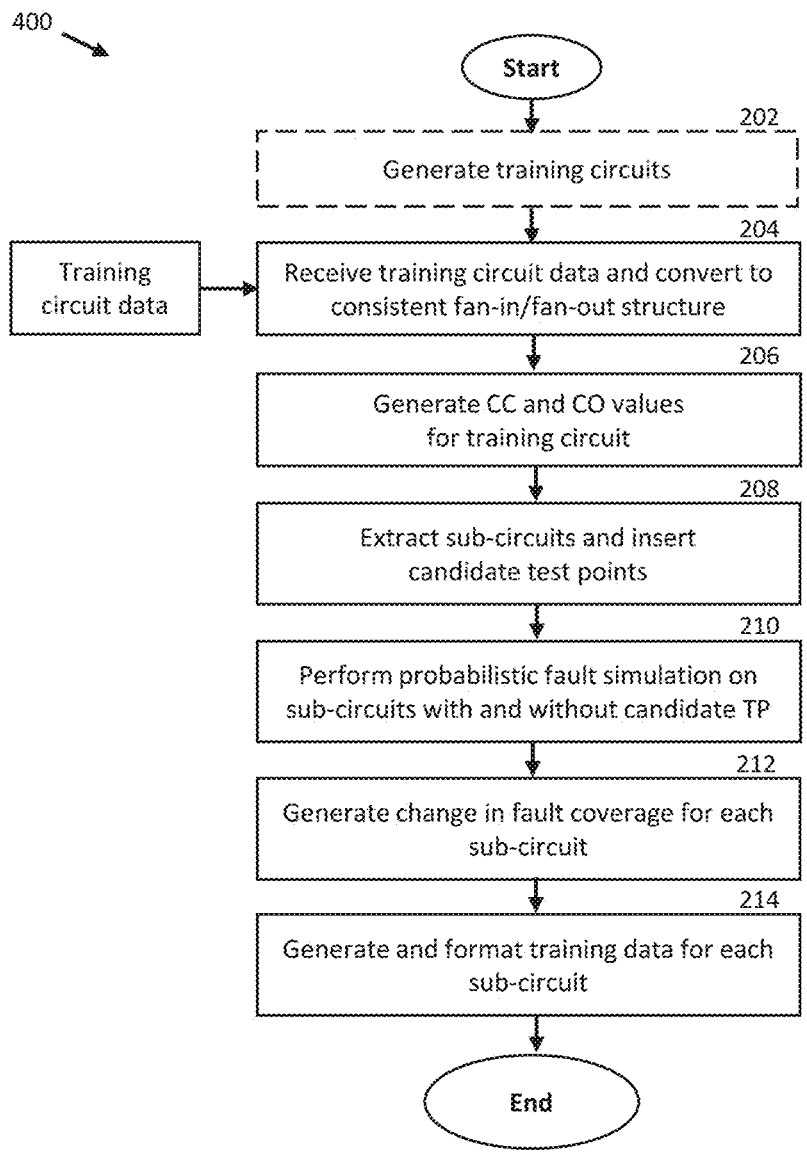
FIG. 4 depicts a flow chart of an exemplary embodiment of a method for configuring training data to train the learning segment, and optionally to generate training circuits.

FIG. 4 is a flowchart of an exemplary embodiment of method 400 for processing and preparing training circuit data (obtained in step 202 of method 200 above) for training the learning segment for embodiments where the learning segment includes at least one ANN for training. In these embodiments, training the learning segment requires true fault coverage data which uses fault simulation. Fault simulation is a CPU intensive process (requires a large amount of processing time and bandwidth), which is why traditional heuristic TPI methods use estimation techniques. However, such estimations can give inaccurate fault coverage results, and thus less effective TPs (lower quality) may be chosen for insertion. Further these techniques also require circuit wide calculations for each candidate TP, which is also CPU intensive. In these embodiments, fault simulation is performed during training, thereby distributing processing requirements across all test point insertion determinations and allowing the learning module to be trained on true fault coverage data. Further, in these embodiments circuit wide calculations are only required once per training circuit, rather than once for every candidate TP. Optionally, method 400 also describes a process for generating training circuit data for training the learning module. In an embodiment, method 400 performs fault simulation with candidate test points on training circuit data to obtain training data for the learning module. It should be understood that steps 404-410 Below are performed for each training circuit received as part of the training circuit data obtained in step 202 of method 200 above and for each training circuit optionally generated by the training segment in step 402 for training.

It should be understood that the candidate test points for the test data can only be placed on lines that are present in the original training circuit data. Accordingly, lines that may be added by default to conform the original training circuit data into training circuit data for the ANN input vector cannot contain candidate test points.

At optional step 402, the training segment generates training circuits to be structured for training the learning segment. Many circuit developers are reluctant to share circuit information, which is needed to best train the learning segment. In an optional embodiment, the training segment generates training circuits by creating directed acyclic graphs (DAGs). DAGs can easily be converted into circuits because DAGs have directional edges (which represent the connection of gates) and no path exists from any vertex (which represents a gate) to itself. The training segment converts a given DAG into a random binary circuit by 1) replacing all vertices of the DAG having no inputs with circuit inputs, 2) replacing all other vertices of the DAG with a randomly selected gate (or if it has 1 input, a buffer or inverter), and 3) replacing dead-end vertices with circuit outputs. In an embodiment, the training segment generates a DAG (to be converted into a circuit) based on the number of circuit inputs to create (I), the minimum number of circuit outputs to create ($O_{min}$), the maximum number of circuit levels (R), the maximum number of fan-ins per gate ($f_{max}$), and the desired number of nodes to create (N). The training segment creates "ranks" of vertices such that in the first rank no vertex has inputs, in the last rank no vertex has outputs, and every vertex in a rank r is connected randomly to vertices in previous ranks. By forcing the first rank to have I vertices, the last to have $O_{max}$, and all others to have (N−O)/R, when the DAG is converted to a circuit it is guaranteed that the circuit will have the correct number of inputs and a minimum number of outputs. In an embodiment, the process for creating a DAG may be implemented as follows:

Inputs: positive integers I, $O_{min}$, R, N, and $f_{max}$
Variables: set of vertices in rank S(r), flattened set of all vertices M, current set of vertices S, current rank r, current set of fan-ins F

```
for r = 0 . . . R do
    if r = 0
        S ← {set of I vertices}
    else if r = R
        S ← {set of O vertices}
    else
```
$$S \leftarrow \left\{\text{set of } \frac{N-O}{R} \text{ vertices}\right\}$$
```
    end if
    if r ≠ 1
        for ∀s ∈ S do
            F = {random set of size 1 . . . f_max from M}
            Set F as inputs to s
        end for
    end if
    S(r) ← S
    M ← {M, S}
end for
return M
```

At step 404, the training circuit is converted into a consistent fan-in/fan-out structure (i.e. gate input and output structure). Before the training data is provided to the learning segment, the training circuits are converted into a consistent fan-in/fan-out structure. This is done because ANNs require input features to be of a constant order. In an embodiment, the training circuits are converted into a circuit structure of 2-inputs per gate and 2-fan-outs per gate. Any given circuit can be converted to this structure by replacing gates with more than 2 inputs with functionally equivalent copies and by adding buffers to fanouts. For example, for gates with one input (e.g., buffers and inverters), the CC and CO of the non-existent input line or a non-existent fan-out is replaced by a "default" value once a candidate test point has been selected.

At step 406, the training segment generates CC and CO values for each line of the converted training circuit. CC and CO values for gates with lines having default values will be generated once a candidate test point is determined.

At step 408, sub-circuits are extracted from the converted training circuit and a candidate test point is identified for each subcircuit. In an embodiment, a predetermined number of sub-circuits are randomly selected from the training circuit. Once the test points are determined in each sub-circuit the sub-circuits are converted to ANN sub-circuits, as described below. In an embodiment, before extracting sub-circuits from the converted training circuit, at least one candidate test point is selected. The extracted sub-circuits are then selected to be centered around candidate test points, which are structured to be ANN sub-circuits, as described below. In an embodiment, sub-circuits for a training circuit will be extracted such that training data will be generated for each potential candidate test point in a training circuit, which will minimize training time.

In an embodiment, redundant vectors are eliminated, also to minimize training time. Since input for an ANN must be of a defined size and circuits come in many sizes, the ANN input may be a sub-circuit centered around a candidate TP's location (an ANN sub-circuit). The sub-circuit size can be expressed in terms of the number of circuit levels (L) before and after the candidate TP location, which in turn can be translated into the number of elements (N and M) to capture, where N is the number of elements in the circuit before the gate of the candidate test point and M is the number of elements in the sub-circuit after the gate of the candidate test point. It should be understood that the more circuit levels in the sub-circuit, the more accurate the training. However, this is a tradeoff between accuracy and processing time (CPU time) to train. If the circuit to analyze is smaller than the ANN sub-circuit size (i.e. the test circuit is smaller than the number of elements N and M to capture for the input vector for the ANN), CC values, CO values, and gate types will be replaced with "default" values. In an embodiment, non-existent inputs/fan-outs in N will have 50% logic-1 controllability and identical observability as the line they drive; non-existent outputs/fan-ins in M will have 100% observability and identical controllability as the line they are driven by; non-existent gate types will be encoded as a "no-hot" (all zeros). At this time any default values for the converted training sub-circuit can be determined.

In embodiments, it is desirable to implement procedures that reduce fault simulation time but still maintain the creation of complete and substantial training data. In embodiments directed to training learning modules for at-fault detection, the number of training vectors generated may be $2^{I'}$ to minimize the possibility of redundant vectors. When sub-circuits are small enough, applying V vectors will guarantee redundant vectors ($V \gg 2^{I'}$) for sub-circuits with I' inputs. Sub-circuit input probabilities exacerbate this, since they make some vectors more likely to occur than others. In embodiments, to remedy this, each vector v' among the $2^{I'}$ possible sub-circuit input vectors is applied to a sub-circuit at most once in V vectors with a probability $p_{V}(v')$. CC and CO values can calculate $p_1(v')$, which in turn finds the probability simulation does not apply the vector among V vectors, $(\overline{p_V(v')})$. This is calculated using the following equation: $v'_i$ are the binary values for each sub-circuit input in v', and $CC_i(v'_i)$ is the probability this value will occur, which is calculated using circuit-wide CC and CO values.

$$p(v') = 1 - \overline{p_V(v')} = 1 - (1 - p_1(v'))^V = 1 - \left(1 - \prod_{\forall i \in I'} CC_i(v'_i)\right)^V$$

If a vector is simulated with probability p(v') and a fault's effect reaches the sub-circuit output(s), the fault is observed on an output with a probability $p_o = 1 - (1 - CO_o)^V$ where $CO_o$ is the COP observability of the sub-circuit output(s). By calculating these probabilities, every $|2^{I'}|$ input vector is simulated at most once with probability p(v'), and if the vector is applied, simulated faults will be considered detected on every sub-circuit output with probability $p_o$.

Given the embodiment for minimizing training vectors for stuck-at fault detection, in embodiments directed to delay fault detection it is also desirable to reduce fault simulation time. In embodiments directed to delay fault detection in embodiments directed to delay fault detection, the number of training vectors generated may be $2^{2 \cdot I'}$ vector pairs, since delay faults require two vectors to detect faults: one to set the initial state and another to launch the circuit transition. To obtain the training label (TDF coverage) from a subcircuit, techniques may be used to reduce training data generation time. Presuming V pseudo-random vector pairs (pairs are required for delay simulation) are applied to a sub-circuit with I' inputs, at least one vector pair will be applied more than once if $V > 2^{2 \cdot I'}$, which is likely for significant values of V and smaller sub-circuit sizes (e.g., $I' \le 6$). Fault simulating a vector pair more than once wastes simulation time. This is exacerbated when sub-circuits are extracted from a circuit, since input vectors to the sub-circuit are not random: paths from circuit inputs to sub-circuit inputs will "weigh" circuit value probabilities and will make some vectors more likely to occur than others. To prevent training vector pairs being applied more than once, the following technique uses heuristically-calculated circuit controllability calculations (and the same techniques used for single vector stuck-at fault detection above) to conditionally simulate all vector pairs. First, for each vector v' among the $2^{I'}$ sub-circuit input vectors, the probability of applying the vector is calculated using circuit controllability information. The same probability of a single vector being simulated, $p_v$, is used to calculate the probability of a vector pair, $v_1$ followed by $v_2$, is simulated: probability $p_{v_1} \cdot p_{v_2}$. If the vector is simulated and a fault effect reaches a sub circuit output on the second vector, it is detected with a probability $p_o$.

At step 410, for each sub-circuit or sub-circuit pair, probabilistic fault simulation is performed (both with and without the candidate test point) and the fault coverage for each sub-circuit is determined for each. Performing probabilistic fault simulation on sub-circuits will greatly reduce the processing (CPU) time to generate training data. Fault simulating V vectors, inserting a TP (randomly or deterministically), and repeating fault simulation to find the change in the number of faults detected gives a TP's true impact on fault coverage, which is more accurate than traditional heuristic-based methods that use less accurate fault coverage calculations. However, fault simulation is computationally demanding: fault simulating V vectors in a circuit with G gates and F faults requires $O(V \cdot G \cdot F)$ time, therefore collecting S training samples requires $O(S \cdot V \cdot G \cdot F)$ time. Reducing V to a small number of vectors is not an option, since LBIST typically applies many vectors. However, by applying the fault simulation to sub-circuits the processing time is significantly reduced. Performing fault simulation on sub-circuits significantly reduces G and F (since the number of faults in a (sub) circuit is proportional to the number of gates), which in turn reduces fault simulation time. However, to account for the fact that under random circuit stimulus, sub-circuit inputs are not truly random, nor are sub-circuit outputs always observed, the CC and CO values are calculated once per training circuit, as listed in step 404 above. This additional O(C) calculation time is negligible when taking a significant number of sub-circuit samples from a given circuit. Fault simulation weights each sub-circuit input vector using these COP controllability values. Additionally, if a fault's effect reaches a sub-circuit output, fault simulation probabilistically detects it using the COP observability values of sub-circuit outputs.

At step 412, once the fault coverage is determined for each sub-circuit and each corresponding test-point inserted sub-circuit, the fault coverages are compared and the change in fault coverage between the sub-circuit and corresponding test-point inserted sub-circuit is determined. At this point, optionally the sub-circuit data (with and without test-point insertion), the fault coverage determinations, and the change in fault coverage can be stored in a database for training purpose. It should be understood that in an embodiment, the training circuit data may be received already processed and formatted for training. In another embodiment, the fault coverage and/or change in fault coverage for each sub-circuit may be provided to the training segment once the sub-circuits are determined, rather than calculated by the training segment. By implementing the procedures above to create a sub-set of vectors and vector pairs, fault simulation time is reduced.

At step 414, the sub-circuit training data is formatted for delivery to the learning module. In an embodiment, the learning module receives sub-circuit training data in a vector format for each training sub-circuit as indicated above and illustrated in FIG. 5.

In an embodiment, each sub-circuit or sub-circuit vector pair is fault simulated T+1 times: once without any TPs and once for each of the T TP types (e.g., T=3 if the TP types are control-0, control-1, and observe points). Fault effects on output pins are probabilistically observed using observability calculations. The controllability, observability, and gate types of the sub-circuit are used for training features and the change in fault coverage created by the T TPs are used as training outputs. This training data could be used to train a learning segment that uses an ANN for each TP type. It could also be combined for use in training a learning segment that uses a single ANN for all TP types.

Figure 3:
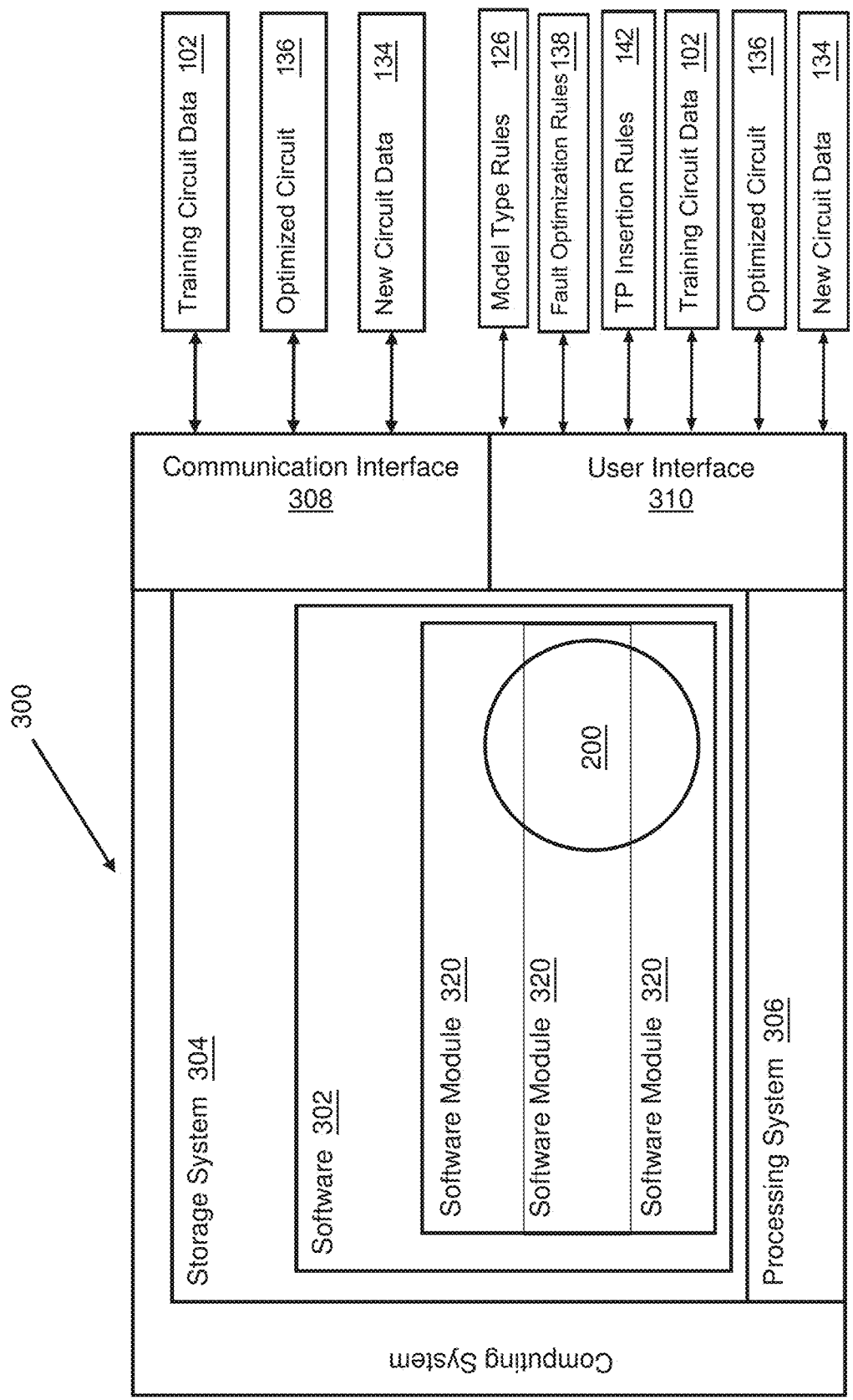
FIG. 3 depicts an exemplary embodiment of a TP insertion optimization system for training a learning segment to create fault prediction models to assist in optimizing test point insertion into new circuits.

FIG. 3 depicts an exemplary embodiment of a TP insertion optimization system 300 for training a learning segment to create fault prediction models to optimize test point insertion into new circuits optimizing fault coverage in new circuits.

System 300 is a computing system that includes a processing system 306, a storage system 304, software 302, a communication interface 308, and a user interface 310. Processing system 306 loads and executes software 302 from the storage system 304, including at least one software component 320. When executed by computing system 300, software component 320 directs the processing system 306 to operate as described herein in further detail in accordance with the methods 200, 400, and system 100. Computing system 300 is a specialized system specifically designed to perform the steps and actions necessary to execute methods 200, 400, and system 100. While some of the component options for computing system 300 may include components prevalent in other computing systems, computing system 300 is a specialized computing system capable of performing the steps and processes described herein. In embodiments, the system 300 may be implement with CPU software, GPU software, on field programmable gate arrays (FPGAs), or in custom logic circuits (i.e., neuromorphic computing). However, in any embodiment the implementation requires that the system be specially formatted to execute methods 200, 400, and system 100.

Computing system 300 includes three software components 320 for performing the functions of testing software component 111, learning software component 121, and predicting software component 131. Although computing system 300 as depicted in FIG. 3 includes three software components 320 in the present example, it should be understood that one or more components could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or sub-systems that cooperate in existing program instructions. Examples of processing systems 306 include central processing units, application specific processors, and logic devices, as well as any other type of processing device, combinations of processing devices, or variations thereof. While there are a number of processing devices available to comprise the processing system 306, the processing devices used for the processing system 306 are particular to this system and must specifically be capable of performing the processing necessary to execute methods 200 and 400, and support system 100.

The storage system 304 can comprise any storage media readable by processing system 306, and capable of storing software 302 that is able to meet the needs of the specific computing system 300 and execute the storage required for methods 200, 400, and system 100. The storage system 304 may include volatile and non-volatile, removable and non-removable media implemented in any method or technology for storage of information, such as computer readable instructions, data structures, program modules, or other data. Storage system 304 may be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300. While many types of storage media may be incorporated into system 300, the storage media used must be specialized to the purpose of executing the storage requirements of methods 200, 400, and system 100 as described herein.

User interface 310 can include one or more user desktop 140, a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display training circuit data 102, optimized circuits 136, new circuit data 134, model type rules 126, fault coverage optimization rules 138, test point insertion rules 142, and associated data/information that may be accessed by users of the system associated with embodiments of the system and methods as disclosed herein. Speakers, printers, haptic devices and other types of output devices may also be included in the user interface 310. A user can communicate with computing system 300 through the user interface 310 in order to update model type rules 126, fault coverage optimization rules 138 and test point insertion rules 142, and provide training circuit data 102 and new circuit data 134, or any number of other tasks the user may want to complete with computing system 300.

As described in further detail herein, computing system 300 receives and transmits data through communication interface 308. In embodiments, the communication interface 308 operates to send and/or receive data, such as, but not limited to, training circuit data 102, new circuit data 134, and optimized circuits 136 to/from other devices and/or systems to which computing system 300 is communicatively connected, to train the learning segment and optimize new circuit data as described in greater detail above.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for optimizing fault coverage for logical circuits, comprising:
   receiving a set of training circuit data, wherein the set of training circuit data includes at least one training circuit;
   analyzing the training circuit data for each training circuit in the set training circuit data to generate a set of training data, wherein the generation of training data includes selecting at least one candidate test point for training circuit, performing fault simulation on each training circuit and associated at least one candidate test point for each candidate test point and associated training circuit, and generating structured training data for each training circuit and associated candidate test point, based on the training circuit data, candidate test point, and fault simulation associated with each training circuit and associated candidate test point combination;
   training a learning segment on the set of training data to learn to predict a change in fault coverage based on the set of training data;
   generating at least one fault coverage model based on the learning of the learning segment, wherein the at least one fault coverage model predicts the change in fault coverage for a circuit;
   selecting a plurality of candidate test points for a new circuit;
   applying the at least one fault coverage model to the selected plurality of candidate test points to determine change in fault coverage for the new circuit;
   stimulating test point insertion of an optimized test point, wherein the optimized test point is the candidate test point that meets a set of test point insertion rules based on results of the application of the at least one fault coverage model to the plurality of candidate test points;
   analyzing the new circuit with the optimized test point to determine if a set of fault coverage optimization rules are achieved;
   repeating the selecting, applying, simulating test point insertion, and analyzing steps above until the set of fault coverage optimization rules are achieved;
   displaying the new circuit with the optimized test point after the fault coverage optimizations rules are achieved.

2. The method of claim 1, wherein each training circuit in the training circuit data includes a set of gates and a set of inputs and a set of outputs associated with each gate representing an associated training circuit from the at least one training circuits.

3. The method of claim 2, wherein the generation of the set of training data further includes:
   for each training circuit in the set of training circuit data, converting the associated training circuit into a consistent fan-in/fan-out structure such that each gate in the associated training circuit that has been converted has only two inputs and only two fan-outs, wherein gates in the set of gates representing the associated training circuit with more than two inputs associated with the gate are replaced with an equivalent set of gates, inputs, and outputs to achieve the consistent fan-in/fan-out structure.

4. The method of claim 3, wherein the generation of the set of training data further includes extracting at least one sub-circuit from each associated training circuit that has been converted and identifying at least one candidate test point for the at least one sub-circuit, wherein the fault simulation and generation of structured training data is performed for each extracted sub-circuit.

5. The method of claim 1, wherein the structured test data includes one training circuit from the at least one training circuit, one-candidate test point from the at least one candidate test point associated with the one training circuit, and an output of the fault simulation, wherein the output of the fault simulation is a change in fault coverage.

6. The method of claim 1, wherein the learning segment includes at least one artificial neural network, wherein the artificial neural network receives the set of test data and automatedly trains itself to predict an output of the fault simulation performed on each of the test circuits and candidate test points, wherein the output of the fault simulation is a change in fault coverage.

7. The method of claim 1, wherein the change in fault coverage is one of stuck-at fault or delay fault.

8. The method of claim 1, wherein the at least one candidate test point for the training circuit is one of a control-1 test point, a control-0 test point, or an observe test point.

9. The method of claim 1, wherein the new circuit data includes a set of gates and a set of inputs and a set of outputs associated with each gate representing the new circuit data.

10. The method of claim 9, further comprising converting the new circuit data into a consistent fan-in/fan-out structure such that each gate in the converted new circuit data has only two inputs and only two fan-outs, wherein gates in the set of gates representing the new circuit data with more than two inputs associated with the gate are replaced with an equivalent set of gates, inputs, and outputs to achieve the consistent fan-in/fan-out structure.

11. The method of claim 10, wherein the selection of the plurality of candidate test points for the new circuit data includes selecting at least one candidate test point for each input and for each output for each gate in the new circuit data.

12. The method of claim 1, further comprising extracting a sub-circuit from the new circuit data for each of the selected plurality of candidate test points and applying the at least one fault coverage model to the extracted sub-circuits, wherein the extracted sub-circuit is centered around the candidate test point.

13. The method of claim 1, wherein the set of test point insertion rules compare the change in fault coverage for each of the plurality of candidate test points and determine that the optimized test point for simulated test point insertion is the candidate test point with a greatest change in fault coverage.

14. The method of claim 1, further comprising generating at least a portion of the received set of training circuit data, wherein the generation of training circuit data includes creating at least one directed acyclic graph (DAG), converting each DAG into a random binary circuit, wherein the random binary circuit represents a training circuit of the at least one training circuits of the set of training circuit data.

15. The method of claim 14, wherein the conversation of each DAG into a random binary circuit includes replacing all vertices of the DAG that have no outputs with a circuit input, replacing all of a set of other vertices of the DAG with a randomly selected gate, and replacing a set of dead-end vertices of the DAG with a circuit output.

16. A system for optimizing fault coverage for logical circuits, comprising:
a processor;
a display with a user interface to display an optimized simulated new circuit; and
a non-transitory computer readable medium programmed with computer readable code that upon execution by the processor causes the processor to:
receive a set of training circuit data, wherein the set of training circuit data includes at least one training circuit;
analyze the training circuit data for each training circuit in the set training circuit data to generate a set of training data, wherein the generation of training data includes selecting at least one candidate test point for training circuit, performing fault simulation on each training circuit and associated at least one candidate test point for each candidate test point and associated training circuit, and generating structured training data for each training circuit and associated candidate test point, based on the training circuit data, candidate test point, and fault simulation associated with each training circuit and associated candidate test point combination;
train a learning segment on the set of training data to learn to predict a change in fault coverage based on the set of training data;
generate at least one fault coverage model based on the learning of the learning segment, wherein the at least one fault coverage model predicts the change in fault coverage for a circuit;
select a plurality of candidate test points for a new circuit;
apply the at least one fault coverage model to the selected plurality of candidate test points to determine change in fault coverage for the new circuit;
stimulate test point insertion of an optimized test point, wherein the optimized test point is the candidate test point that meets a set of test point insertion rules based on results of the application of the at least one fault coverage model to the plurality of candidate test points;
analyze the new circuit with the optimized test point to determine if a set of fault coverage optimization rules are achieved;
repeat the selecting, applying, simulating test point insertion, and analyzing steps above until the set of fault coverage optimization rules are achieved;
display the new circuit with the optimized test point after the fault coverage optimizations rules are achieved.

17. The system of claim 16, wherein the non-transitory computer readable medium further causes the processor to create a logic circuit based on the new circuit with the optimized test point after the fault coverage optimizations rules are achieved.

18. The system of claim 16, wherein the learning segment includes at least one artificial neural network, wherein the artificial neural network receives the set of test data and automatedly trains itself to predict an output of the fault simulation performed on each test circuits and each associated candidate test, wherein the output of the fault simulation is a change in fault coverage.

19. The system of claim 16, wherein the non-transitory computer readable medium further causes the processor to generate at least a portion of the received set of training circuit data, wherein the generation of training circuit data includes creating at least one directed acyclic graph (DAG), converting each DAG into a random binary circuit, wherein the random binary circuit represents a training circuit of the at least one training circuits of the set of training circuit data, further wherein the conversation of each DAG into a random binary circuit includes replacing all vertices of the DAG that have no outputs with a circuit input, replacing all of a set of other vertices of the DAG with a randomly selected gate, and replacing a set of dead-end vertices of the DAG with a circuit output.

20. A non-transitory computer readable medium programmed with computer readable code that upon execution by a processor causes the processor to execute a method for optimizing fault coverage for circuits, comprising:
receiving a set of training circuit data, wherein the set of training circuit data includes at least one training circuit;
analyzing the training circuit data for each training circuit in the set training circuit data to generate a set of training data, wherein the generation of training data includes selecting at least one candidate test point for training circuit, performing fault simulation on each training circuit and associated at least one candidate test point for each candidate test point and associated training circuit, and generating structured training data for each training circuit and associated candidate test point, based on the training circuit data, candidate test point, and fault simulation associated with each training circuit and associated candidate test point combination;
training a learning segment on the set of training data to learn to predict a change in fault coverage based on the set of training data;
generating at least one fault coverage model based on the learning of the learning segment, wherein the at least one fault coverage model predicts the change in fault coverage for a circuit;
selecting a plurality of candidate test points for a new circuit;
applying the at least one fault coverage model to the selected plurality of candidate test points to determine change in fault coverage for the new circuit;
stimulating test point insertion of an optimized test point, wherein the optimized test point is the candidate test point that meets a set of test point insertion rules based on results of the application of the at least one fault coverage model to the plurality of candidate test points;

analyzing the new circuit with the optimized test point to determine if a set of fault coverage optimization rules are achieved;

repeating the selecting, applying, simulating test point insertion, and analyzing steps above until the set of fault coverage optimization rules are achieved;

displaying the new circuit with the optimized test point after the fault coverage optimizations rules are achieved.

* * * * *